United States Patent
Harber et al.

(10) Patent No.: US 8,360,193 B2
(45) Date of Patent: Jan. 29, 2013

(54) ARRANGEMENT OF STEERING WHEEL AND OPERATOR SEAT ASSEMBLY

(75) Inventors: Neil Vincent Harber, Holy Cross, IN (US); Nathan Joseph Horstman, Durango, IA (US); Charles Jon Paul Asp, Epworth, IA (US); James Michael Frett, Peosta, IA (US); Martin Lavern Ruhter, Dubuque, IA (US); Michael Eugene Kennedy, Dubuque, IA (US); Darrell Jeffrey Rowan, Dubuque, IA (US); Richard John Gotto, Farley, IA (US); Richard Arnold Valenzuela, East Moline, IL (US); Josh Dean Graeve, Peosta, IA (US); Maurice Thomas Nesbitt, Southwold (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/408,381

(22) Filed: Feb. 29, 2012

(65) Prior Publication Data

US 2012/0152574 A1    Jun. 21, 2012

Related U.S. Application Data

(63) Continuation of application No. 13/247,182, filed on Jan. 10, 2012, which is a continuation of application No. 12/257,787, filed on Oct. 24, 2008, now Pat. No. 8,091,678.

(60) Provisional application No. 61/068,569, filed on Mar. 7, 2008.

(51) Int. Cl.
*B62D 1/24* (2006.01)
(52) U.S. Cl. .......................... 180/320; 180/321; 180/336
(58) Field of Classification Search .................. 180/320, 180/321, 324, 336; 74/471 XY
See application file for complete search history.

(56) References Cited

U.S. PATENT DOCUMENTS

| | | | |
|---|---|---|---|
| 3,011,739 A | 12/1961 | Boyce et al. | |
| T875019 I4 | 6/1970 | Haddad et al. | |
| 3,737,003 A | 6/1973 | Beals et al. | |
| 4,182,456 A | 1/1980 | Paul | |
| 4,200,166 A | 4/1980 | Hansen | |
| 4,291,896 A | 9/1981 | Koch | |
| RE31,646 E | 8/1984 | Beals et al. | |
| 4,476,954 A | 10/1984 | Johnson et al. | |
| 4,664,221 A | 5/1987 | Loney et al. | |
| 4,682,787 A | 7/1987 | Ruhter et al. | |
| 4,702,520 A | 10/1987 | Whisler et al. | |
| 4,706,776 A | 11/1987 | Hyoki et al. | |
| 4,738,417 A | 4/1988 | Wenger | |
| 4,821,837 A | 4/1989 | Fifer | |
| 4,985,040 A | 1/1991 | Heywood et al. | |
| 5,229,742 A | 7/1993 | Miyamoto et al. | |
| 5,379,663 A | 1/1995 | Hara | |
| 5,584,346 A | 12/1996 | Sakamoto et al. | |
| 5,612,718 A | 3/1997 | Bryan | |
| 5,632,353 A | 5/1997 | Kimberley | |

(Continued)

FOREIGN PATENT DOCUMENTS

| | | |
|---|---|---|
| DE | 10316350 | 10/2004 |
| WO | WO2006038847 | 4/2006 |

OTHER PUBLICATIONS

Merriam-Webster's Dictionary Definition of "Joystick" available at http://www.merriam-webster.com/dictionary/joystick (last visited on May 23, 2011).

(Continued)

*Primary Examiner* — Faye M. Fleming
(74) *Attorney, Agent, or Firm* — Faegre Baker Daniels LLP

(57) ABSTRACT

A control system for a construction vehicle, such as a motor grader, is provided. The control system includes a plurality of joysticks supported by an operator seat assembly of the motor grader.

24 Claims, 26 Drawing Sheets

U.S. PATENT DOCUMENTS

| | | | |
|---|---|---|---|
| 5,727,387 | A | 3/1998 | Hosseini et al. |
| 5,924,515 | A | 7/1999 | Stauffer |
| 5,938,282 | A | 8/1999 | Epple |
| H1822 | H | 12/1999 | Kelley et al. |
| H1831 | H | 2/2000 | Kelley et al. |
| 6,039,141 | A | 3/2000 | Denny |
| 6,061,617 | A | 5/2000 | Berger et al. |
| 6,065,560 | A | 5/2000 | Palmeri et al. |
| D427,207 | S | 6/2000 | Altmann et al. |
| D427,208 | S | 6/2000 | Altmann et al. |
| 6,131,062 | A | 10/2000 | Nielsen |
| 6,152,239 | A | 11/2000 | Kelley et al. |
| 6,164,285 | A | 12/2000 | Garberg et al. |
| 6,307,486 | B1 | 10/2001 | Takeda et al. |
| 6,341,821 | B1 | 1/2002 | Rousseau |
| H2024 | H | 6/2002 | Kelley et al. |
| 6,580,418 | B1 | 6/2003 | Grome et al. |
| 6,634,453 | B2 | 10/2003 | Arthur et al. |
| 6,948,582 | B2 | 9/2005 | Shiomi et al. |
| D513,415 | S | 1/2006 | Klein et al. |
| 7,014,255 | B2 | 3/2006 | Amamiya et al. |
| 7,100,467 | B2 | 9/2006 | Shiomi et al. |
| 7,117,970 | B2 | 10/2006 | Shiomi et al. |
| 7,137,475 | B2 | 11/2006 | Shiomi et al. |
| 7,172,050 | B2 | 2/2007 | Amamiya |
| 7,178,623 | B2 | 2/2007 | Ginzel et al. |
| D541,824 | S | 5/2007 | Yanagida et al. |
| D546,841 | S | 7/2007 | McCarren, Jr. et al. |
| 7,265,304 | B2 | 9/2007 | Ichiki et al. |
| D555,676 | S | 11/2007 | Haubrich et al. |
| 7,290,635 | B2 | 11/2007 | Bisick et al. |
| D556,790 | S | 12/2007 | Harber et al. |
| 7,377,148 | B2 | 5/2008 | Cassidy et al. |
| 7,389,845 | B2 | 6/2008 | Longueville et al. |
| 7,458,439 | B2 | 12/2008 | Catton et al. |
| 7,497,298 | B2 | 3/2009 | Shearer et al. |
| 7,635,045 | B2 | 12/2009 | Shearer et al. |
| 7,677,654 | B2 | 3/2010 | Enberg et al. |
| 7,729,835 | B2 | 6/2010 | Morris et al. |
| 7,748,785 | B2 | 7/2010 | Lucas et al. |
| 7,950,492 | B2 | 5/2011 | Jorgensen |
| 8,104,566 | B2 | 1/2012 | Harber et al. |
| 2002/0166267 | A1 | 11/2002 | McGugan |
| 2004/0256898 | A1 | 12/2004 | Longueville et al. |
| 2006/0000656 | A1 | 1/2006 | Bisick et al. |
| 2006/0021419 | A1 | 2/2006 | Cassidy et al. |
| 2006/0021819 | A1 | 2/2006 | Shearer et al. |
| 2006/0042857 | A1 | 3/2006 | Catton et al. |
| 2006/0144634 | A1 | 7/2006 | Portscheller et al. |
| 2007/0017728 | A1 | 1/2007 | Sano |
| 2007/0253840 | A1 | 11/2007 | Harber et al. |
| 2007/0295551 | A1 | 12/2007 | Proud et al. |
| 2008/0023250 | A1 | 1/2008 | Hefner et al. |
| 2008/0265646 | A1 | 10/2008 | Enberg et al. |
| 2009/0223684 | A1 | 9/2009 | Knepper et al. |
| 2009/0223734 | A1 | 9/2009 | Frett et al. |
| 2011/0121553 | A1 | 5/2011 | Battistella et al. |

OTHER PUBLICATIONS

Cambridge Dictionary of American English Definition of "Frame" available at http://dictionaries.cambridge.org.define.asp?key=frame*2+0&dict=A (last visited Jun. 13, 2011).

John Deere Motor Graders Brochure, found via internet search, available at http://www.deere.com/en_US/docs/construction/motor_graders/DKAGGDR.pdf. (last visited Jun. 13, 2011)(pub. date of document itself is not known with certainty; however on last p. (40), at the bottom of the page the following writing appears "DKAGGDR Litho in U.S.A. (10-05)").

John Deere, D Graders, available at http://www.deere.com/en_US/cfd/construction/deere_const/media/pdf/motorgraders/DKADGDRAWD.pdf, printed on Oct. 8, 2009.

SAE Off Highway Engineering Magazine, Jan./Feb. 2008, pp. 48-49.

Caterpillar, 120M Motor Grader Product Brochure, AEHQ5729-01 (Jun. 2007), pp. 1-28, available at http://www.cat.com/cmms/images/C514464.pdf, printed on Oct. 8, 2009.

Caterpillar, 120M Motor Grader "Benefits & Features" Website, available at http://www.cat.com/cda/layout?m=308637&x=7, printed on Oct. 8, 2009.

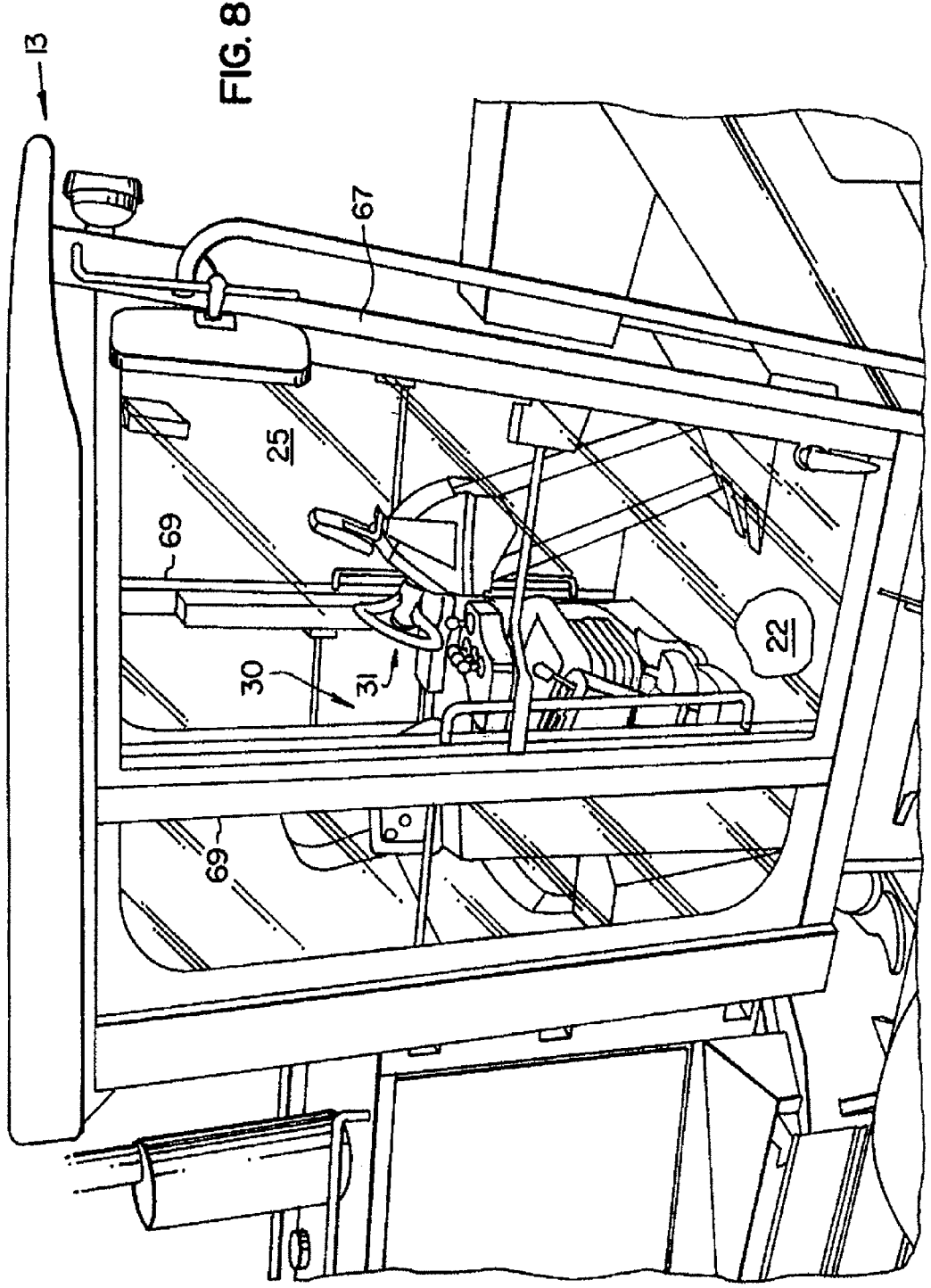

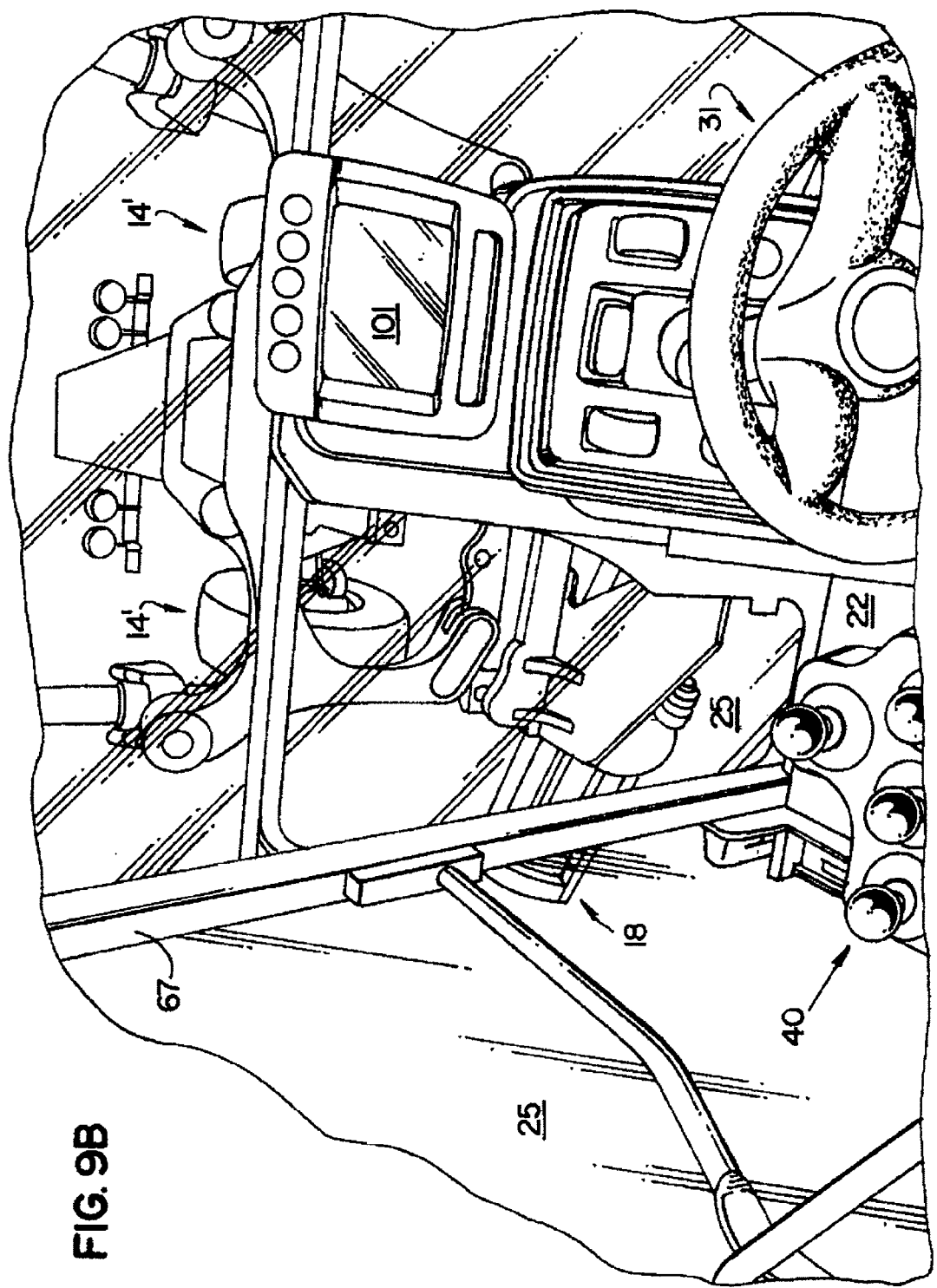

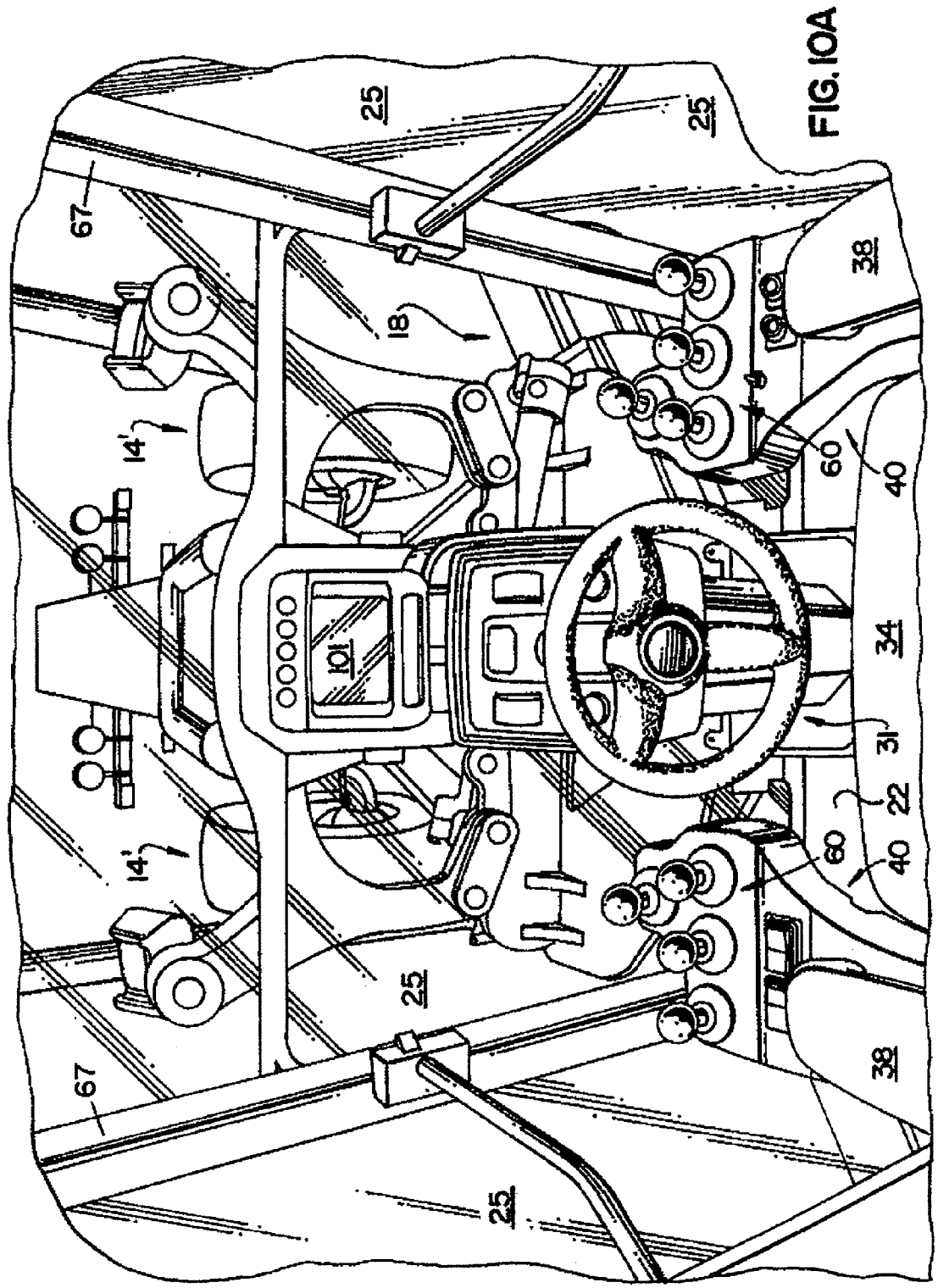

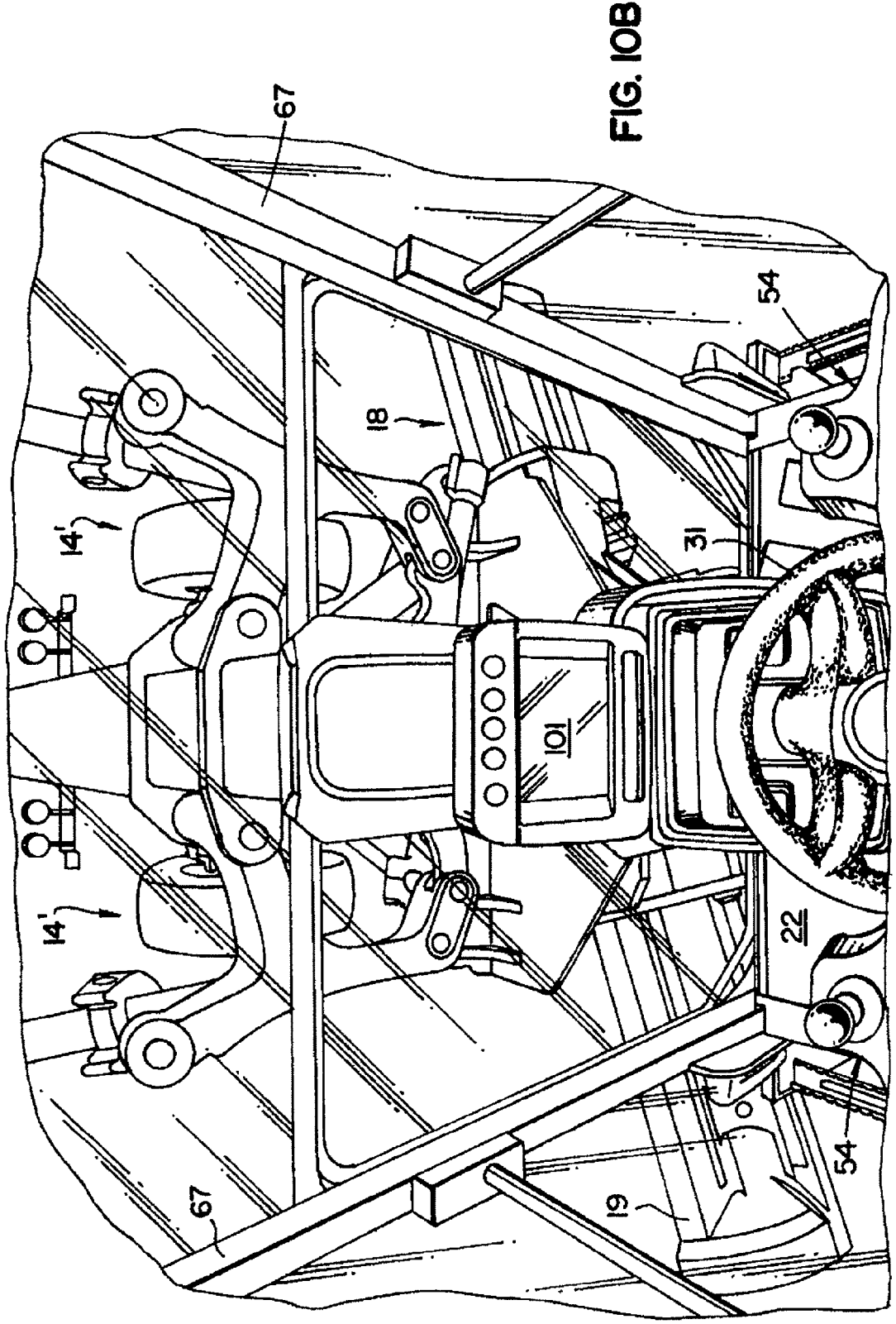

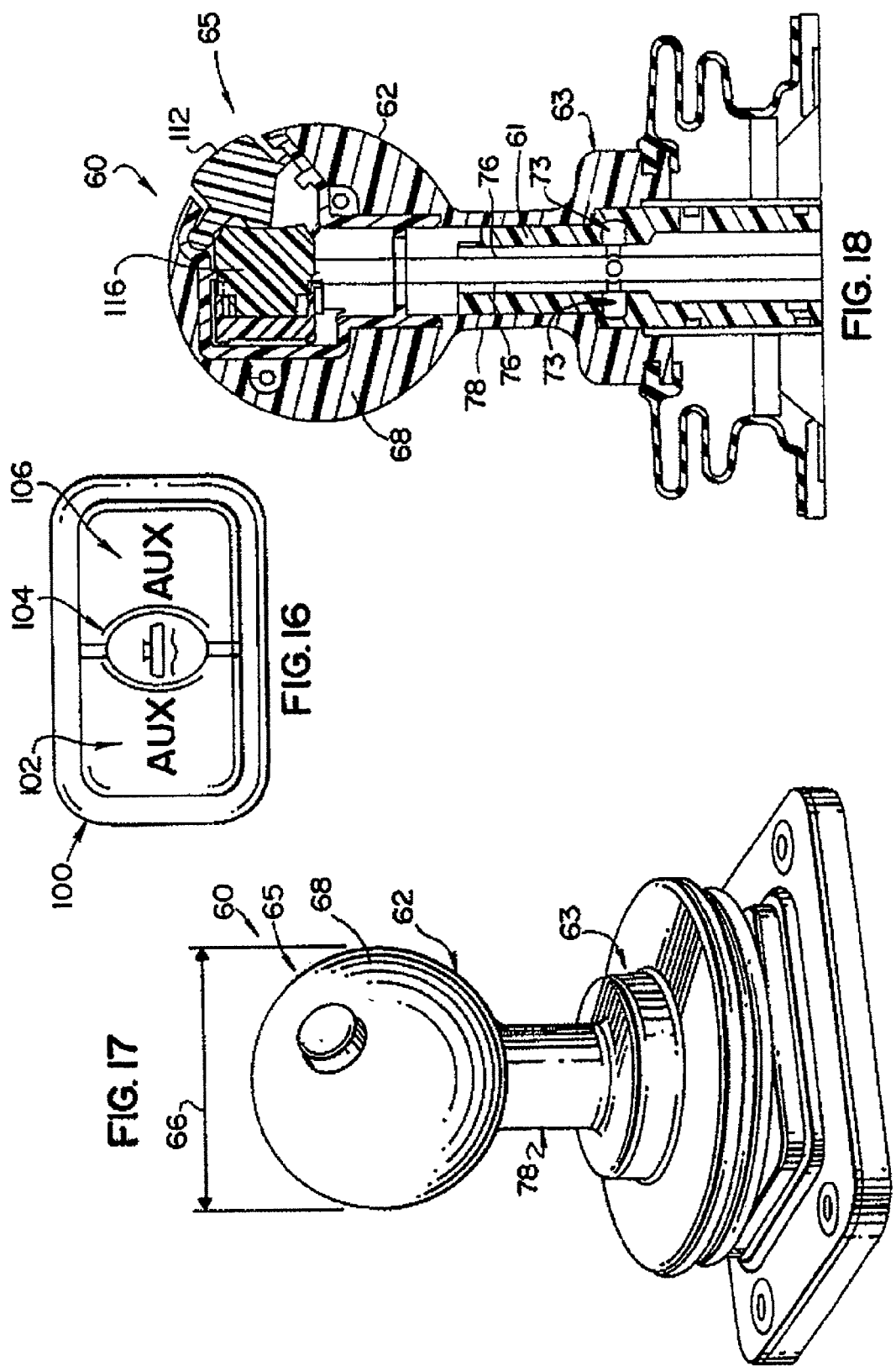

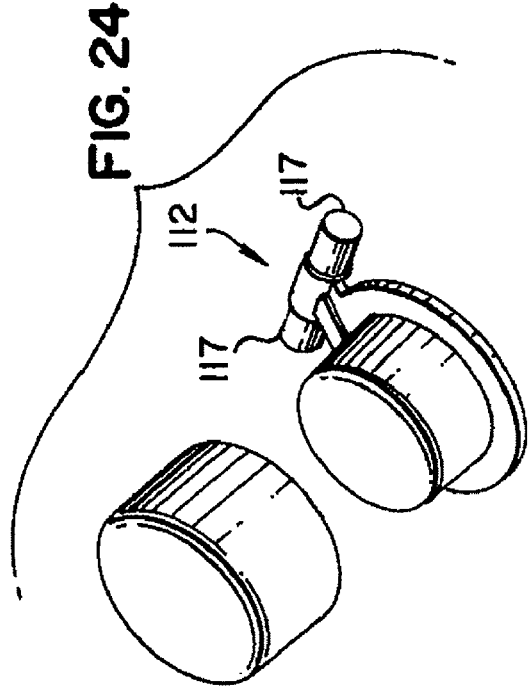
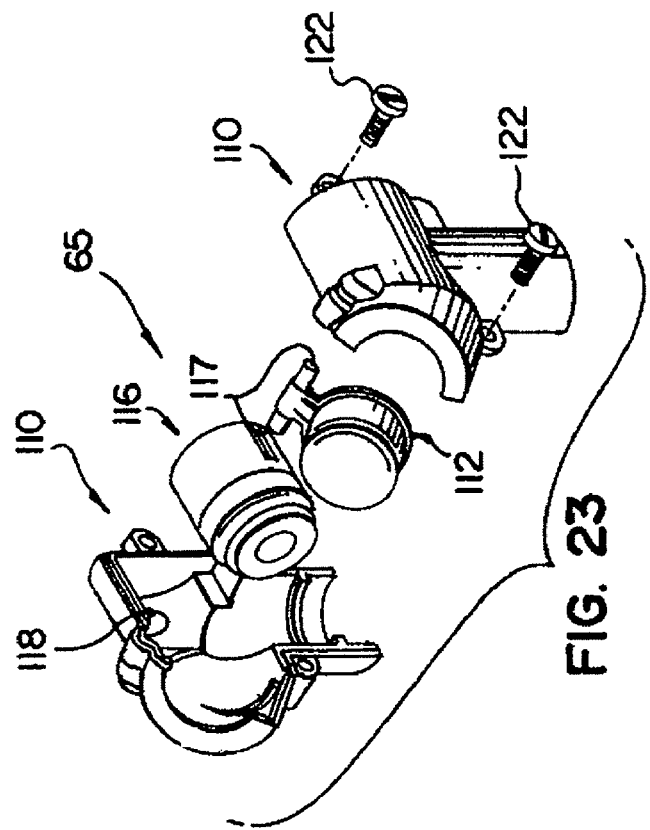

ARRANGEMENT OF STEERING WHEEL AND OPERATOR SEAT ASSEMBLY

CROSS-REFERENCE TO RELATED APPLICATIONS

The present application is a continuation of U.S. patent application Ser. No. 13/347,182 to Ruhter et al., titled "INPUT CONTROL PATTERN," filed Jan. 10, 2012, which is a continuation of U.S. patent application Ser. No. 12/257,787 to Rowan et al., now U.S. Pat. No. 8,091,678, also titled "INPUT CONTROL PATTERN," filed Oct. 24, 2008, which claims the benefit of U.S. Provisional Patent Application Ser. No. 61/068,569 to Ruhter et al., titled "ARMREST MOUNTED GRADER CONTROL," filed Mar. 7, 2008, the entire disclosures of which are expressly incorporated herein by reference.

FIELD OF THE INVENTION

The present disclosure includes a console for controlling a construction vehicle, such as a motor grader.

BACKGROUND OF THE INVENTION

Skilled motor grader operators have learned to operate the motor grader based on a learned "feel" of the machine, and can accurately control numerous controls simultaneously to provide accurate grades at high productivity. Highly skilled grader operators have a preferred control pattern for motor graders such that nearly all graders have similar lever arrangements, including lever and knob size, lever efforts and lever travel. These traditional motor grader controls are a series of individual levers arranged on either side of the steering wheel. Each lever individually controls a single function on the motor grader through a mechanical linkage system connected to a hydraulic valve.

SUMMARY OF THE INVENTION

According to an aspect of the present invention, a construction vehicle is provided that includes: a chassis; a plurality of traction devices positioned to support the chassis on the ground; a steering wheel supported by the chassis and configured to control the direction of travel of the construction vehicle across the ground; a ground engaging blade moveably coupled to the chassis; a control system including a plurality of joysticks, each of the plurality of joysticks being configured to control at least one function of the construction vehicle; and an operator seat assembly supported by the chassis, the operator seat assembly including a frame, a seat, and a back support; and a console supported by the operator seat assembly and supporting the plurality of joysticks of the control system, the console being spaced apart from the steering wheel by a distance of 3 inches or less.

According to another aspect of the present invention, a construction vehicle is provided that includes: a chassis; a plurality of traction devices positioned to support the chassis on the ground; a steering wheel supported by the chassis and configured to control the direction of travel of the construction vehicle across the ground, the steering wheel having a diameter; a ground engaging blade moveably coupled to the chassis; a control system including a plurality of joysticks, each of the plurality of joysticks being configured to control at least one function of the construction vehicle; an operator seat assembly supported by the chassis, the operator seat assembly including a frame, a seat, a pair of armrests laterally spaced apart by an armrest gap, and a back support, a ratio of the armrest gap to the steering wheel diameter being greater than 1.5; and a console supported by the operator seat assembly and supporting the plurality of joysticks of the control system.

According to yet another aspect of the present invention, a construction vehicle is provided that includes: a chassis; a plurality of traction devices positioned to support the chassis on the ground; a steering wheel supported by the chassis and configured to control the direction of travel of the construction vehicle across the ground; a ground engaging blade moveably coupled to the chassis; a control system including a plurality of joysticks, each of the plurality of joysticks being configured to control at least one function of the construction vehicle; an operator seat assembly supported by the chassis, the operator seat assembly including a frame, a seat, a pair of armrests laterally spaced apart by an armrest gap, and a back support; and a console supported by the operator seat assembly and supporting the plurality of joysticks of the control system, the console and the steering wheel being spaced apart by a console-steering wheel gap, a ratio of the armrest gap to the console-steering wheel gap being greater than 5.

According to still yet another aspect of the present invention, a construction vehicle is provided that includes: a chassis; a plurality of traction devices positioned to support the chassis on the ground; a steering wheel supported by the chassis and configured to control the direction of travel of the construction vehicle across the ground; a ground engaging blade moveably coupled to the chassis; an operator seat assembly supported by the chassis, the operator seat assembly including a frame, a seat, a pair of armrests laterally spaced apart by an armrest gap, and a back support; a control system including a first plurality of joysticks and a second plurality of joysticks, each of the first and second plurality of joysticks being configured to control at least one function of the construction vehicle; a first console supported by the operator seat assembly and supporting the first plurality of joysticks of the control system; and a second console supported by the operator seat assembly and supporting the second plurality of joysticks of the control system, the first and second consoles being laterally spaced apart by a console gap, a ratio of the armrest gap to the console gap being greater than 1.25.

BRIEF DESCRIPTION OF THE DRAWINGS

The above-mentioned and other features of the present disclosure will become more apparent and will be better understood by reference to the following description of embodiments of the present disclosure taken in conjunction with the accompanying drawings, wherein:

FIG. 8 is a perspective view of the operator cab of the motor grader of FIG. 1;

FIG. 9B is a view of the grader blade from the operator cab;

FIG. 10A is a view through the lower front of the operator cab;

FIG. 10B is another view through the lower front of the operator cab;

FIG. 16 is a top plan view of a float switch;

FIG. 17 is a perspective view of a joystick for use with a motor grader;

FIG. 18 is a cross-sectional view of the joystick of FIG. 17;

FIG. 23 is an assembly view of the button assembly of the joystick of FIG. 17;

FIG. 24 is an assembly view of a button and button cap of the button assembly;

Figure 1:
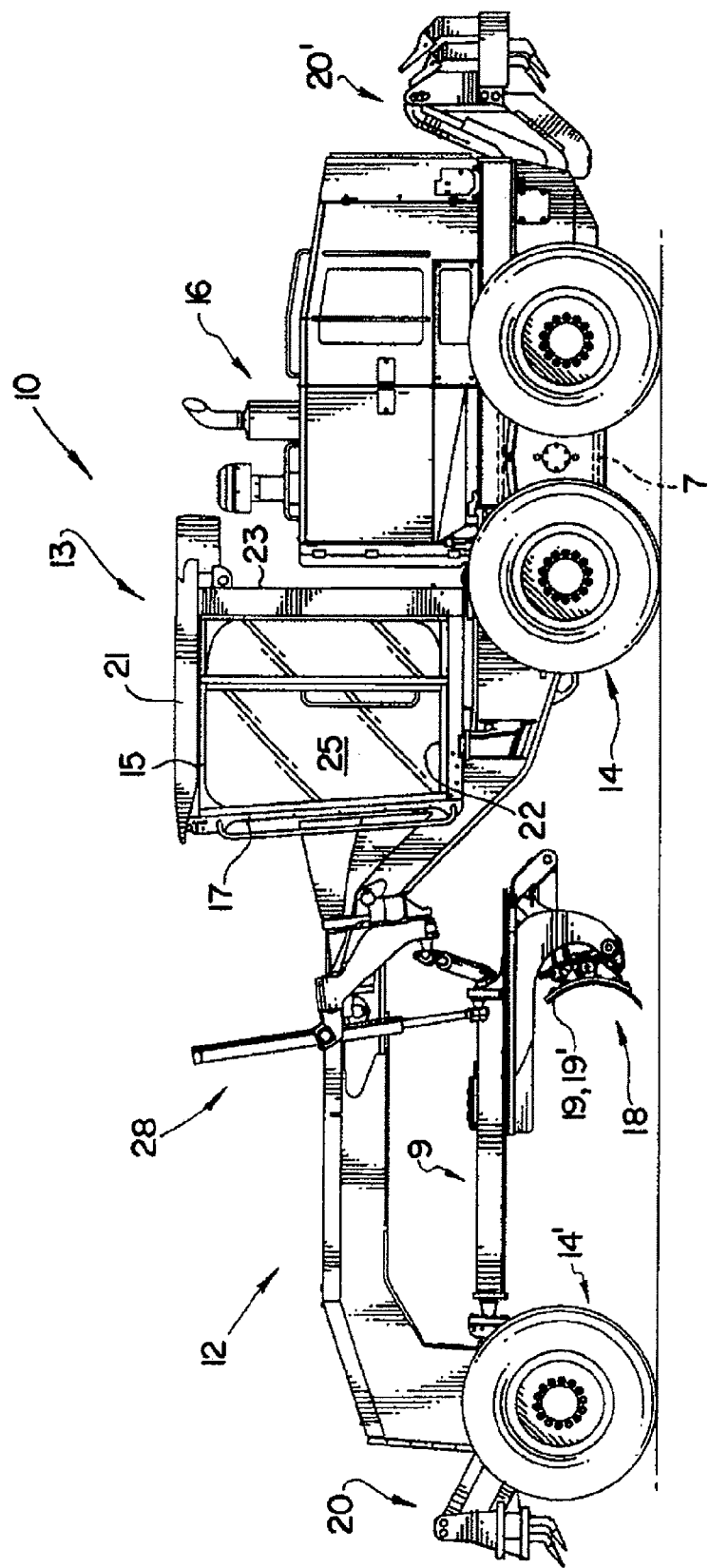
FIG. 1 is a side elevation view of a motor grader showing the motor grader including a chassis, a cab supported by the chassis, a grader blade extending below the chassis, and a plurality of wheels or traction devices supporting the chassis on the ground.

Corresponding reference characters indicate corresponding parts throughout the several views. Although the drawings represent embodiments of the present invention, the drawings are not necessarily to scale and certain features may be exaggerated in order to better illustrate and explain the present invention.

DESCRIPTION OF THE PREFERRED EMBODIMENTS OF THE INVENTION

The embodiments disclosed below are not intended to be exhaustive or limit the invention to the precise forms disclosed in the following detailed description. Rather, the embodiments are chosen and described so that others skilled in the art may utilize their teachings.

Motor grader 10 is shown in FIG. 1 for spreading and leveling dirt, gravel, or other materials. Grader 10 includes articulated chassis 12, operator cab 13, and a plurality of rear wheels 14, also described as traction devices, to propel chassis 12 and the remainder of grader 10 along the ground, a pair of front steerable wheels 14', which may also be described as traction devices, engine 16 to power operation of grader 10, transmission 7 (shown in phantom) transmitting power from engine 16 to rear wheels 14, motor grader circle 9, and grader blade 18 supported by circle 9 and including distal heal 19 and opposite distal toe 19' for spreading and leveling. In addition to blade 18, grader 10 is provided with a front mounted ripper/scarifier 20 and a rear mounted ripper/scarifier 20' for working the soil prior to grading operations.

Although a motor grader is described in detail, the features described herein may be provided on other vehicles such as bull dozers, front loaders, and other construction vehicles having various ground engaging tools and traction devices, such as wheels and tracks. Grader blade 18 is described as a ground engaging blade, but is not limited to engagement with soil, dirt, gravel, etc. It and other ground engaging blades, such as snow plows 11 (shown in phantom in FIG. 7) or snow wings 9 (shown in phantom in FIG. 7), may also engage other materials, such as snow.

Operator cab 13 includes pair of lateral side walls 15, front wall 17, roof 21, and rear wall 23 and a floor 22 defining an interior region of operator cab 13. Side walls 15 and front wall 17 include windows 25.

Figure 2:
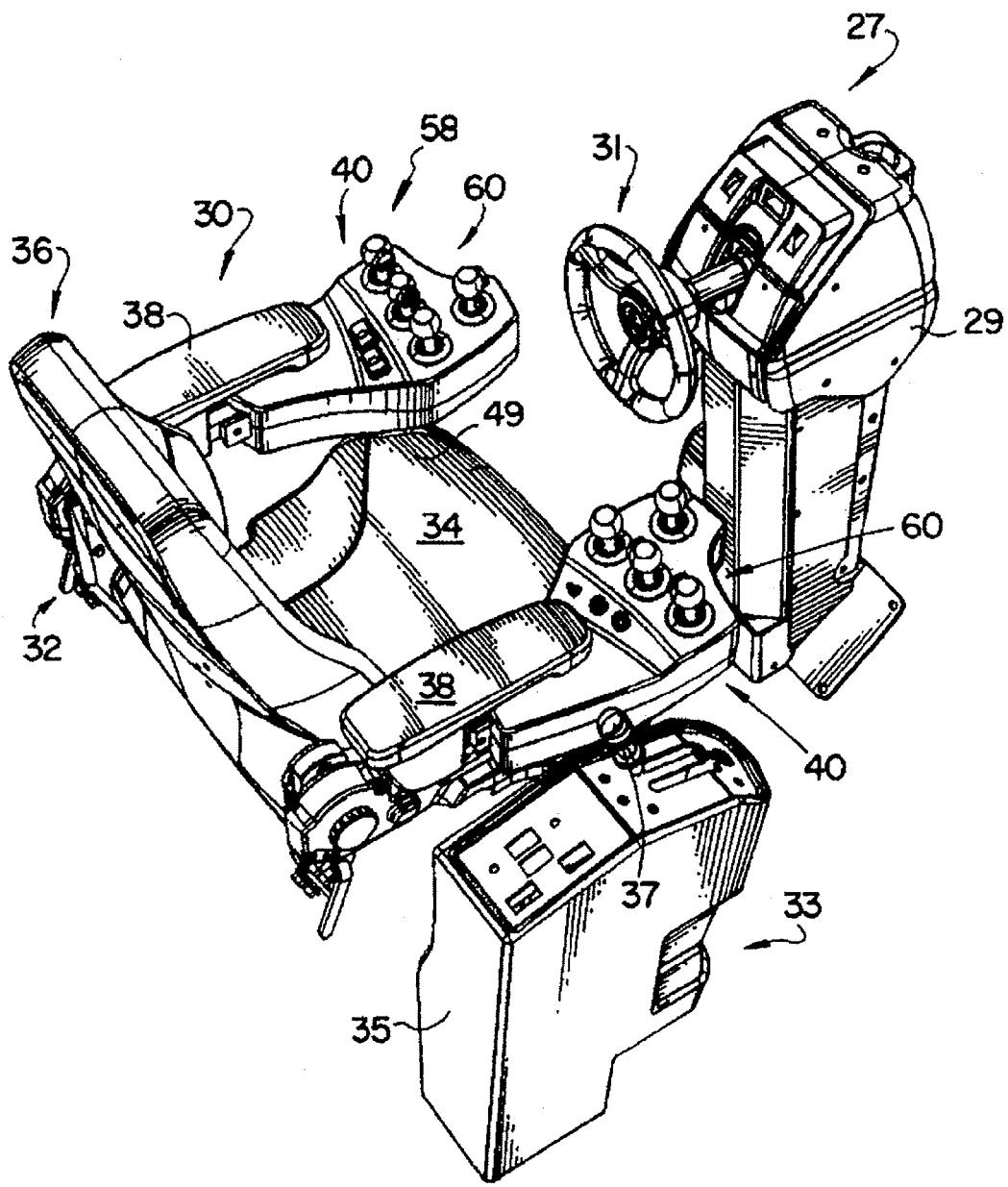
FIG. 2 is a rear perspective view of an operator seat assembly, shift console, and steering console configured for use within the cab of the motor grader.

Referring to FIG. 2, operator seat assembly 30 is positioned in operator cab 13 and includes frame 32, seat 34, back support 36, armrest 38, and control console 40. Each of seat 34, back support 36, armrest 38, and control consoles 40 are coupled to and supported by frame 32. Control consoles 40 support several inputs 60 of control system 58 of motor grader 10.

Figure 5A:
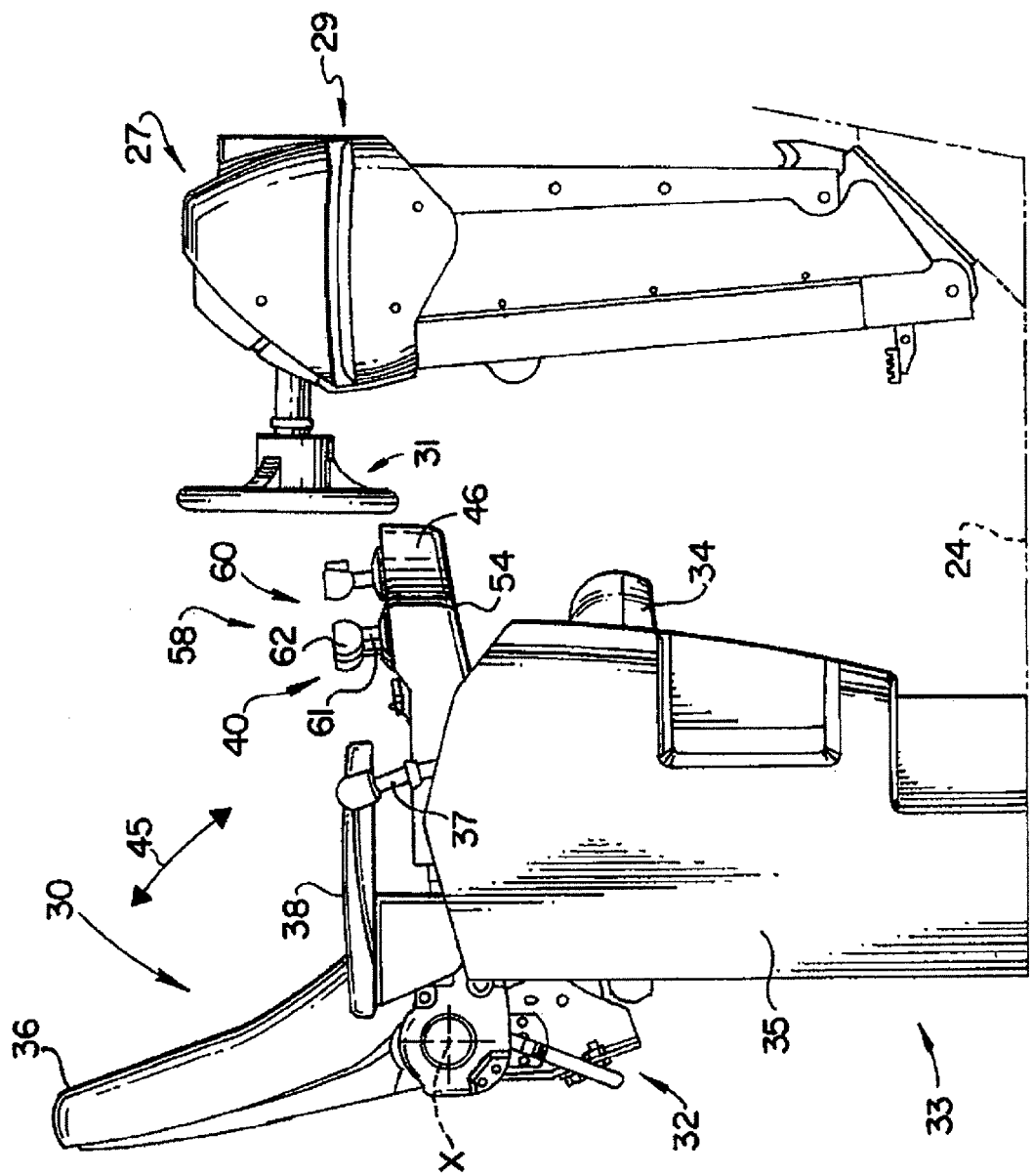
FIG. 5A is a side elevation view of the operator seat assembly, shift console, and steering console of FIG. 2.
Figure 5B:
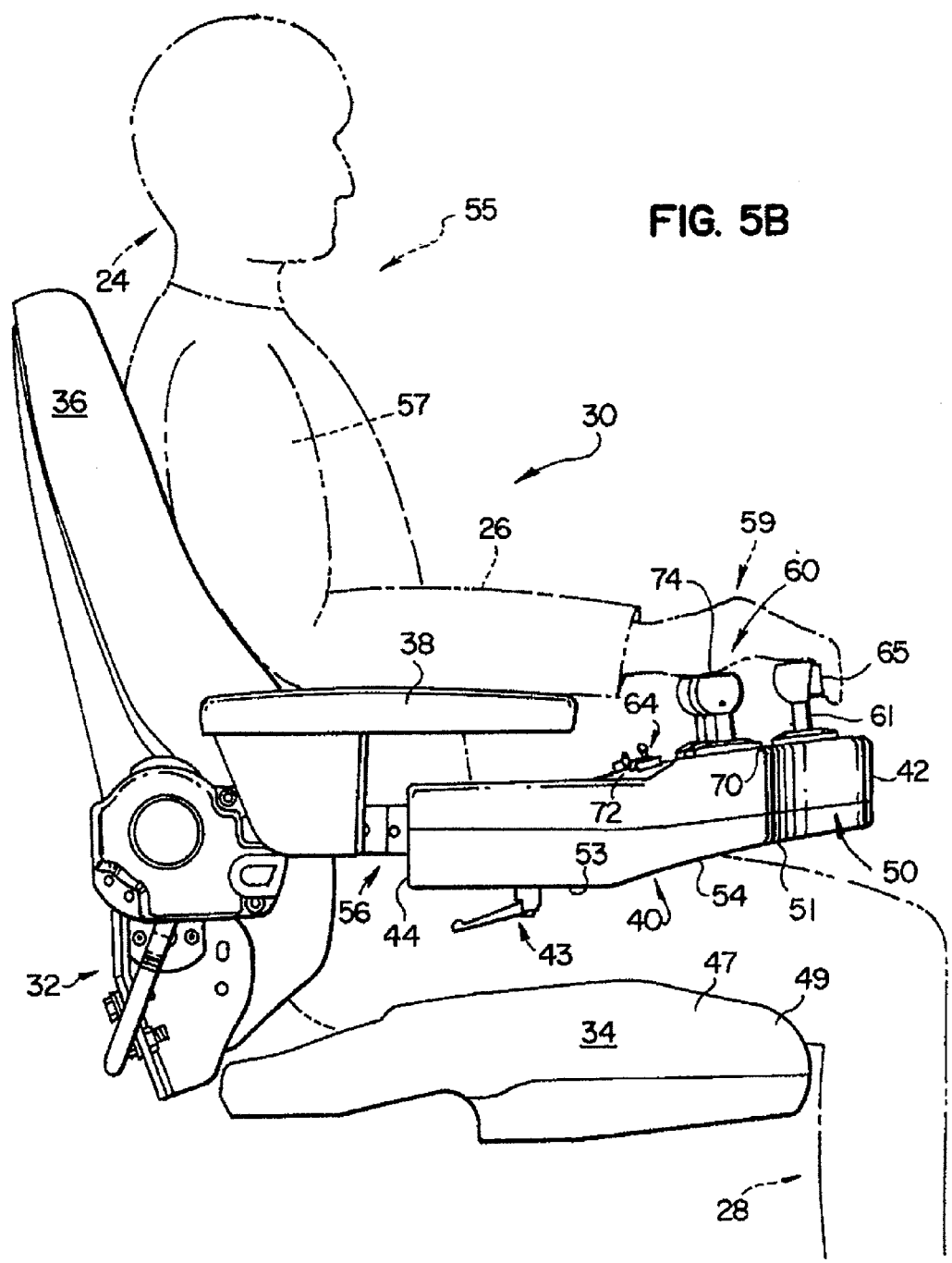
FIG. 5B is a view similar to FIG. 5A with the shift console not shown, showing an operator (in phantom) supported by the operator seat assembly.

Operator seat assembly 30 is configured to rotate relative to chassis 12 to permit operator 55 (FIG. 5B) to rotate operator seat assembly 30 as desired. Because armrests 38 and control consoles rotate with seat assembly 30, the operator's arms 26 remain in the same position relative to inputs 60 as operator 55 rotates seat assembly 30. The forward and rearward position of console 40 may be adjusted by loosening clamp 43, as shown in FIG. 5B. As shown in FIG. 5A, armrests 38 and consoles 40 may rotate about a common axis X in direction 45 upward to provide access to seat 34. According to the preferred embodiment, only left armrest 38 and console 40 rotate.

Steering console assembly 27 is positioned forward of seat assembly 30 and includes steering column or pedestal 29 and steering wheel 31 rotatably coupled to steering column 29 to control steering of motor grader 10. Steering column 29 is coupled to floor 22 of cab 13. Steering wheel 31 has a preferred diameter 63 of 10 inches (25.4 cm). Steering wheel 31 and consoles 40 cooperate to define a console-steering wheel gap 71 of about 1.6 inches (4.0 cm).

Shift console assembly 33 is positioned to the right of seat assembly 30 and includes a pedestal 35 coupled to floor 22 of cab 13 and a shift lever 37 operatively connected to pedestal 35. Pedestal 35 is spaced apart from right control console 40 by about 1.6 inches (4.0 cm). Shift lever or shifter 37 controls transmission 7.

According to an exemplary embodiment of the present disclosure, control system 58 is electronic and interacts with the electrohydraulic systems (electrohydraulic valves, hydraulic cylinders, etc.) of motor grader 10. Thus, motor grader 10 is controlled by an electro-hydraulic (EH) system. Wires (not shown) extend from inputs 60 of control system 58 through cab 13 to the electrohydraulic valves (not shown) located outside of cab 13. Because only wires, rather than hydraulic lines, exit cab 13, cab 13 is sealed better and quieter than if hydraulic lines extended into cab 13. Although motor grader 10 uses an EH, other systems, such as all hydraulic systems may be provided for motor grader 10.

To improve the view of an operator and reduce operator fatigue, inputs 60 of control system 58 are placed nearer to the operator. According to the exemplary embodiment, inputs 60 are placed on control consoles 40 in front of armrest 38. By placing inputs 60 on nearer the operator, viewing through front wall 17 of cab 13 is not obstructed by mechanical levers and linkages extending through the floor of cab adjacent to front wall 17. For example, as shown in FIGS. 8, 9A, 9B and 10, windows 25 extend substantially to floor 22 of cab 13 with no obstruction due to floor mounted control levers. To further place inputs 60 out of the line of sight of the operator, some of controls 60 are placed directly over seat 34 of seat assembly 30.

Figure 3:
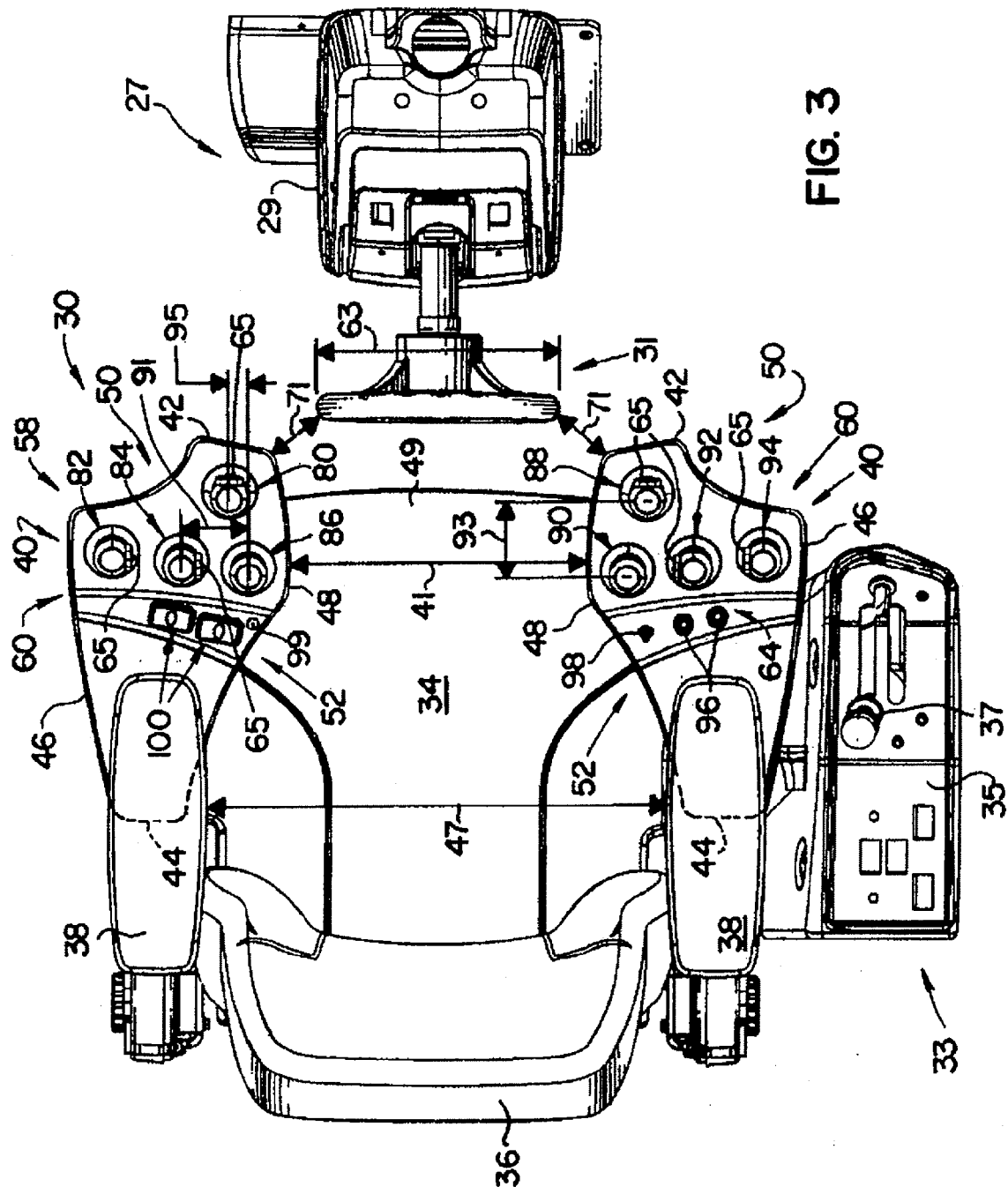
FIG. 3 is a top view of the operator seat assembly, shift console, and steering console of FIG. 2.

As shown in FIGS. 3 and 5B, seat consoles 40 include forward end or forward portions 42, rearward end or rearward portions 44, console outboard sides 46, and console inboard sides 48. Consoles 40 define blade viewing recesses 50, radiused, torso recesses 52, and leg recesses 54, shown in FIGS. 5A and 5B.

In one illustrative embodiment, control consoles 40 are at least partially located below armrests 38 as shown in FIG. 5B. By placing control consoles 40 below armrests 38, inputs 60 are in a convenient location for the operator's palms and fingers 59 and are further out of the line of sight of the operator. Rearward portions 44 of consoles 40 are positioned directly below a portion of armrests 38.

As mentioned above, to improve the line of sight of the operator, inputs 60 are placed nearer the operator. To facilitate this placement, at least a portion of control console 40 is located directly above seat 34 to place several of inputs also directly above seat 34 nearer the operator. For example, console inboard side 48 of console 40 is positioned directly above a forward, outboard portion 49 of seat 34 as shown in FIG. 3. As a result of this placement, innermost portions of control consoles 40 define a control console gap 41 of about 13.4 inches (34.1 cm) between control consoles 40. For reference, innermost portions of armrest 38 define an armrest gap 47 of about 19.3 inches (49.1 cm). According to alternative embodiments, other control console gaps 41 and armrest gaps 47 are provided. According to the present disclosure, the ratio of armrest gap 47 to steering wheel diameter 63 is greater than 1.5. According to the preferred embodiment, this ratio is about 1.93, but other ratios may be provided, such as 1.25, 1.75, 2.0, 2.5, 3.0, etc. According to the present disclosure, the ratio of armrest gap 47 to console-steering wheel gap 71 is greater than five. According to the preferred embodiment, this ratio is about 12.3, but other ratios may be provided, such as 3, 4, 6, 8, 10, 15, 20, etc. According to the present disclosure, the ratio of armrest gap 47 to console gap 41 is greater than 1.25. According to the preferred embodiment, this ratio is about 1.44, but other ratios may be provided, such as 0.9, 1.1, 1.3, 1.5, 1.7, etc.

Figure 6:
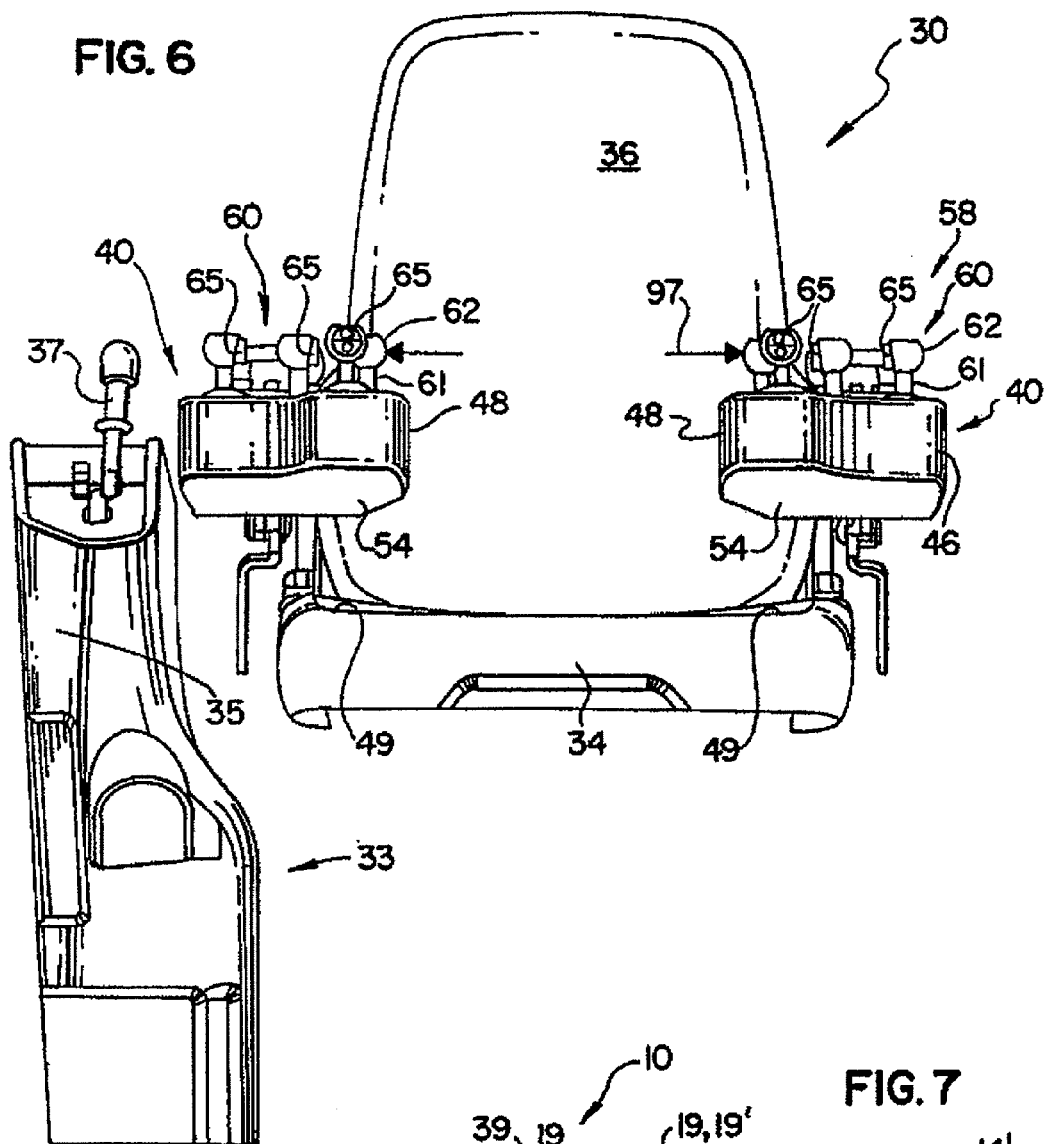
FIG. 6 is a front view of the operator seat assembly and shift console of FIG. 2.

As also illustrated in FIGS. 5B and 6, leg recesses 54 provides legs 28 with additional space underneath the portions of control consoles 40 positioned directly over seats 34. Forward, downwardly facing surfaces 51 of control consoles 40 that define leg recesses 54 have a higher elevation than reward, downwardly facing surfaces 53 of control consoles 40.

As shown in FIG. 2, control system 58 includes a plurality of inputs 60, such as joysticks and switches. In an illustrative embodiment, joysticks 60 define a control pattern for motor graders utilizing joysticks 60. Control system 58 allows operator 55 (FIG. 5B) to finely adjust multiple functions on the motor grader 10 to achieve accurate and precise control during grading operations.

Left control console 40 supports a plurality of joysticks 60. As shown in FIG. 3, front joystick 80 that controls the pitch of blade 18 by moving it forward and backward and controls raising and lower of ripper 20' by moving left and right. Left, rear joystick 82 controls the height of the left end of blade 18 by moving it forward and backward. Center, rear joystick 84 controls side shifting of blade 18 by moving it forward and backward and controls steering of motor grader 10 by moving in left and right. Once front wheels 14 are turned by moving center, rear joystick 84 left (or right), they remain turned left (or right) until center, rear joystick 84 is moved to the right (or left). Steering through using center rear joystick 84 is in addition to steering wheel 31 of vehicle 10. Thus, two inputs are provided on vehicle 10 for controlling steering of front wheels 14. According to alternative embodiments of the present disclosure, the steering and other functions may be controlled by any of the other joysticks 60. Rear, right joystick 86, controls the angle of blade 18 through rotation of the grader circle by moving forward and backward.

Right control console 40 also supports a plurality of joysticks 60. Front joystick 88 that controls the articulation of motor grader 10 by moving it forward and backward and controls raising and lower of ripper 20 by moving left and right. Left, rear joystick 90 controls the side shift of the grader circle by moving it forward and backward. Center, rear joystick 92 controls the lean of front wheels 14 of motor grader 10 by moving it forward and backward. Rear, right joystick 94 controls the height of the right end of blade 18 by moving it forward and backward.

Joysticks 60 are positioned close enough to facilitate an operator's hand 59 and allow operator 55 to reach each joystick with limited or not arm movement. In the preferred embodiment, lateral spacing 91 between joysticks 60 in a row is about 2.6 inches (6.5 cm). Thus, the total spread between the tops of joysticks 60 in a row is about 5.2 inches (13.0 cm). The longitudinal spacing 93 between forward and rear joysticks is about 2.7 inches (6.8 cm). The lateral spacing 95 between forward and rear joysticks is about 1.3 inches (3.25 cm). The lateral spacing 97 between inboard joysticks 60 on each control console 40 is about 16.6 inches (4.21 cm).

As shown in FIG. 3 on left console 40, left, rear joystick 82 includes button assembly 65 facing inward that acts as a left hand integrated grade control or "IGC" switch. When IGC switch 65 on left, rear joystick 82 is pressed, this joystick 60 becomes a master blade lift lever so that if left, rear joystick 82 is actuated to raise a left end of blade 18, the right end of blade 18 also raises to maintain the slope of blade 18.

Center, rear joystick 84 includes a pair of button assemblies 65 facing inward that acts as an IGC to provide increment/decrement. When one of button assemblies 65 is pressed, the slope of blade 18 increases by a predetermined increment, such as 0.1 degrees. When the other button assembly 65 is pressed, the slope of blade 18 decreases by the predetermined increment. Front joystick 80 may also include button assemblies 65 facing forward.

On right console 40, front joystick 88 includes button assembly 65 facing forward that returns the articulation of motor grader 10 to straight. Center, rear joystick 92 includes button assemblies 65 facing inward that provide the IGC increment/decrement function described above. Thus, according to one configuration of the control functions, button assemblies of center, rear joystick 84 of left console 40 and center, rear joystick 92 of right console 40 control the same functions. According another configuration of the control functions, these button assemblies control different functions. For example, according to one configuration, blade 18 is provided with a curb sensor that detects the height of blade 18 relative to a curb. When this feature is activated, button assemblies 65 on center, rear joystick 84 of left console 40 can control the increment/decrement of the blade height and button assemblies 65 of center, rear joystick 92 of right console 40 can control the slope of blade 18.

Rear, right joystick 94 includes button assembly 65 facing inward that acts as a right hand IGC switch. When IGC switch 65 on right, rear joystick 94 is pressed, this joystick 60 becomes a master blade lift lever so that if right, rear joystick 94 is actuated to raise a right end of blade 18, the left end of blade 18 also raises to maintain the slope of blade 18.

As shown in FIG. 3, control system 58 also includes auxiliary joystick inputs 64, such as auxiliary joysticks 96, differential lock switch 98, as well as float switches 100. A horn button 99 may be provided to the right of float switches 100 or elsewhere. Differential lock switch 98 control the locking and unlocking of the motor grader differential.

Float switches 100 control the float function of the ground engaging devices supported by motor grader 10. The float function allows blade 18 and the other ground engage blades (such as snow plows 11, snow wings 9, etc.) to float or ride over the hard surfaces (such as pavement) rather than be rigid relative to the hard surface. For example, when the float function is activated, the hydraulic cylinders controlling snow plow 11 would not be in a rigid fixed position, but would allow snow plow 11 to float over the pavement so that any rollers supporting the snow plow 11 could roll over the pavement and avoid snow plow 11 gouging the payment. As shown in FIG. 16, each float switch 100 includes left, middle, and right bubble switches 102, 104, 106. Middle bubble switch 104 is raised relative to left and right bubble switches 102, 106 to allow a user to locate it tactilely. Middle bubble switch 104 on left float switch 100 controls the float of the left end of blade 18 and the middle bubble switch 104 on right float switch 100 controls the float of the right end of blade 18. Left and right bubble switches 102, 106 control the float function of auxiliary attachments, such as snow plows 11 and snow wings 9.

Several auxiliary functions are controlled by mini auxiliary joysticks 96 by moving them forward and backward and right and left. Additional auxiliary functions are provided by front joystick stick 80 on left console 40 by using the unused axes of movement of primary joysticks 80, 82, 84, 86, 88, 90, 92, 94 and/or primary joysticks 80, 82, 84, 86, 88, 90, 91, 94 without button assemblies 65. The auxiliary functions control the operation of accessories attached to motor grader 10, not including blade 18. Such attachments may include rippers 20, 20', snow plow 11, and snow wing 9 that are attached to the front, end, or sides of motor grader 10. These functions may include the position (height or lateral position) and orientation (pitch, rotation, etc.)

When left armrest 38 and left console 40 are raised in direction 45, a sensor (not shown) detects this movement and disables the controls, such as joysticks 60 and the other controls. If an operation of motor grader 10 is active when left armrest 38 and left console 40 are raised, the operation is terminated.

Figure 7:
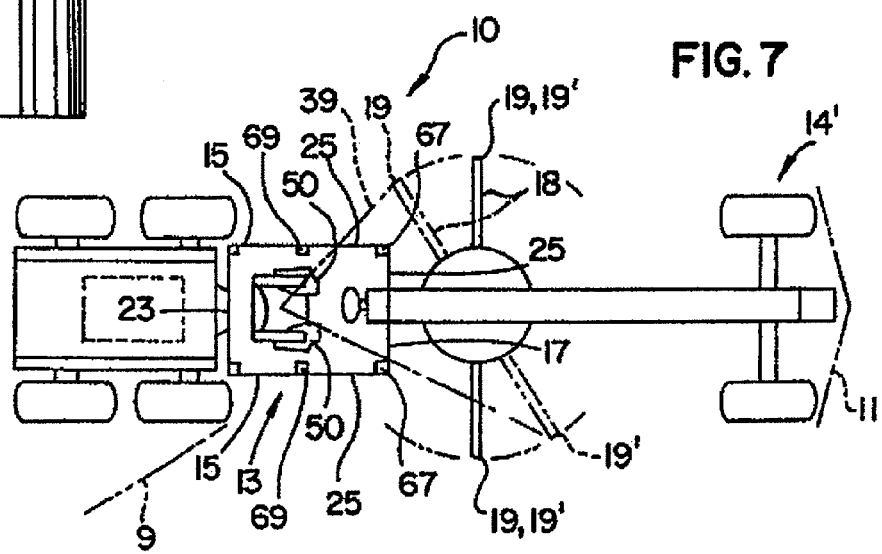
FIG. 7 is a schematic top plan view of the motor grader of FIG. 1 showing the operator's view of the grader blade
Figure 9A:
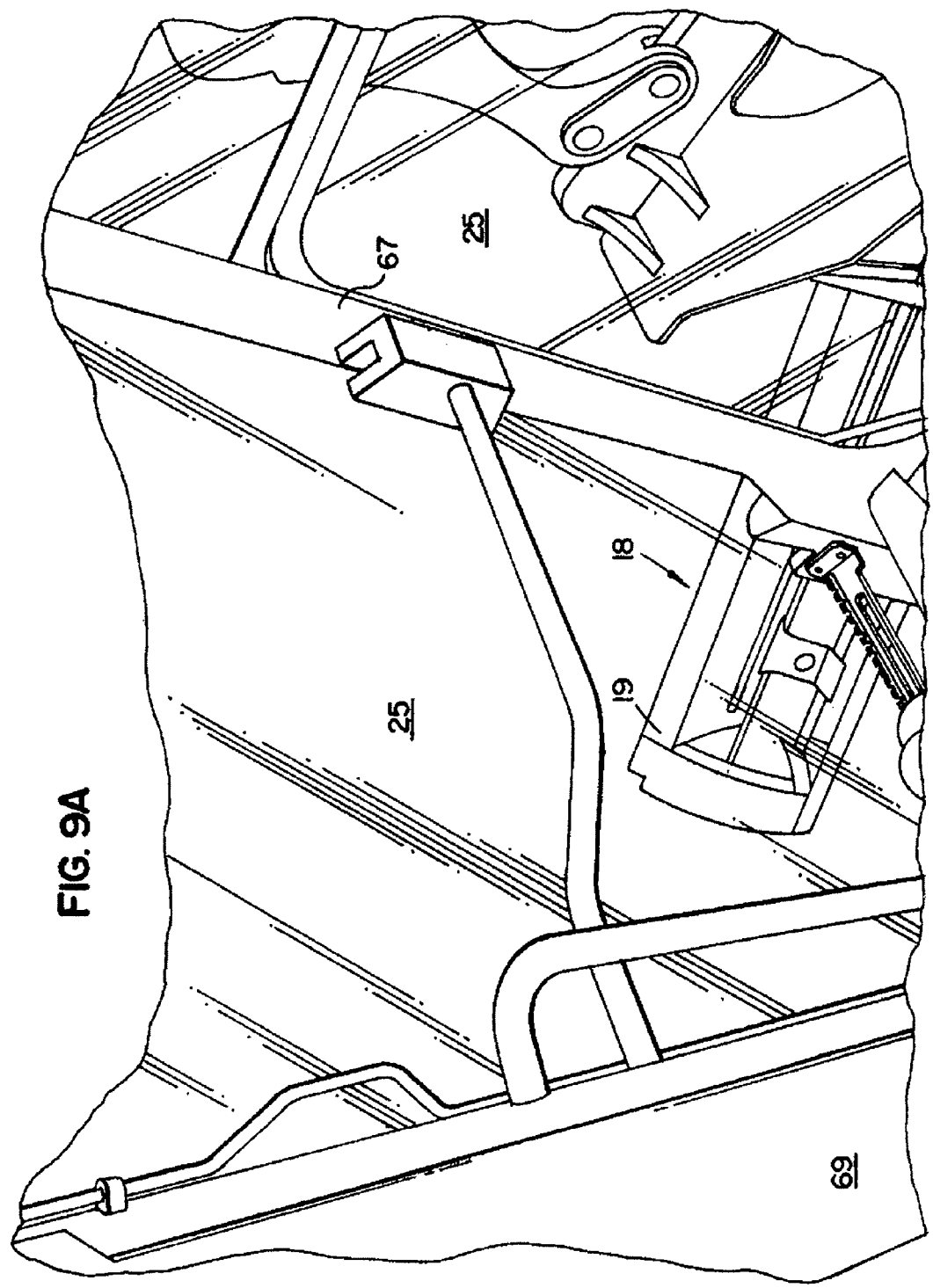
FIG. 9A is a view of the blade heel from the operator cab.
Figure 9C:
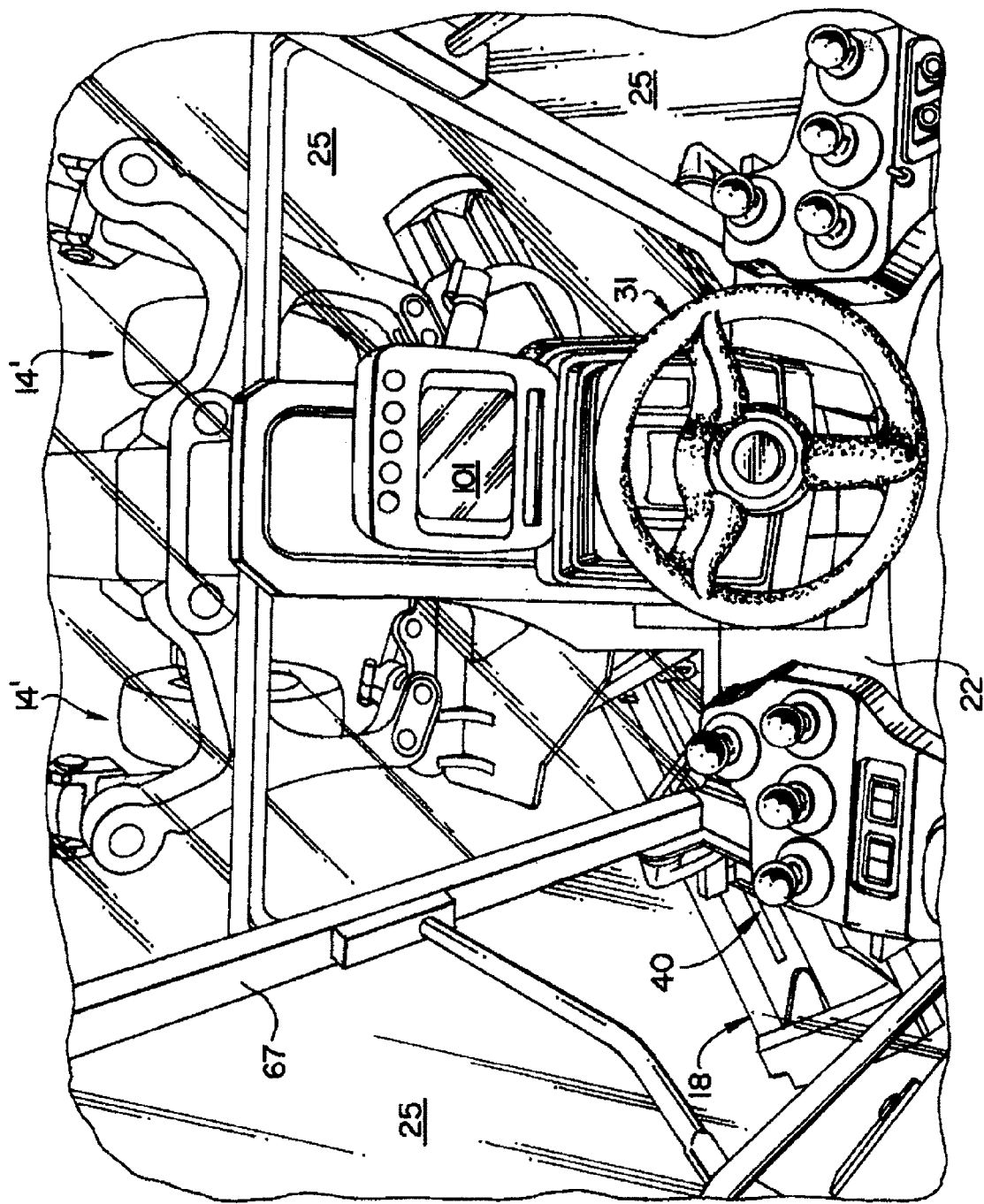
FIG. 9C is another view of the grader blade from the operator cab.

Blade viewing recess 50 is configured to allow operator 55, shown in FIG. 5B, to view a portion of grader blade 18, such as blade toe 19' or blade heel 19 as shown in FIG. 7. Reference to blade toe 19' and blade heel 19 depends on the direction in which the blade 18 is rotated. When grader blade 18 is rotated to the position shown in phantom in FIG. 7, the operator's line of site 39 may extend through blade viewing recess 50 so that less of console 40 is blocking the operator's view. As previously described, inputs 60 control functions of grader blade 18 so that blade viewing recess 50 allows operator 55 to view the result of a control function of motor grader 10 while simultaneously viewing blade 18. Armrest 38 is configured to adjust in height and angle to allow the operator to adjust the position of recess 50 and otherwise increase their visibility.

As shown in FIG. 7, front vertical posts 67 separate side walls 15 and front wall 17. Similarly, middle vertical posts 69 divide side walls 15. Because front vertical posts 67 are at the extreme lateral edge of cab 13, they do not block the view of the operator looking forward. Thus, the operator may see implements supported by the front of chassis 12, such as front ripper 20 or a snow blade (shown in phantom). Similarly, because middle vertical posts 69 are positioned behind the front of seat assembly 30, they do not block the operator's view of blade 18.

In this embodiment as shown in FIGS. 3 and 5B, consoles 40 include console primary bases 70, which supports joysticks 60, and consoles 40 includes console secondary bases 72, which supports auxiliary joysticks 64, differential switch 98, and float switches 100. Console primary base 70 is illustrated as higher than console secondary base 72 to provide approximately one inch (2.5 cm) of clearance. As shown in FIG. 5B, joysticks 60 include an uppermost surface 74 that is higher than auxiliary joysticks 64.

FIG. 5B also illustrates operator 55 supported by operator seat assembly 30. Operator 55 includes head 24, torso 57, arm 26, hand or fingers 59, and legs 28. As illustrated in FIG. 5B, the operator's arm 26 rests upon armrest 38 in an ergonomically comfortable position. Armrest 38 is configured to support arm 26 and also to provide operator 55 with a frame of reference during movement of motor grader 10. Furthermore, fingers 59 are positioned to comfortably reach joysticks 60 while arm 26 is supported by armrest 38. Adjustment system 56 is configured to adjust the location of console 40 in relation to operator seat assembly 30, operator 55, or fingers 59. Hand or fingers 59 are also able to comfortably reach auxiliary joysticks 64, differential lock switch 98, and float switches 100. In one embodiment, hand or fingers 59 are provided approximately one inch of clearance over auxiliary inputs 64, differential lock switch 98, and float switches 100 based on the height of console secondary base 72 in relation to console primary base 70.

Figure 11:
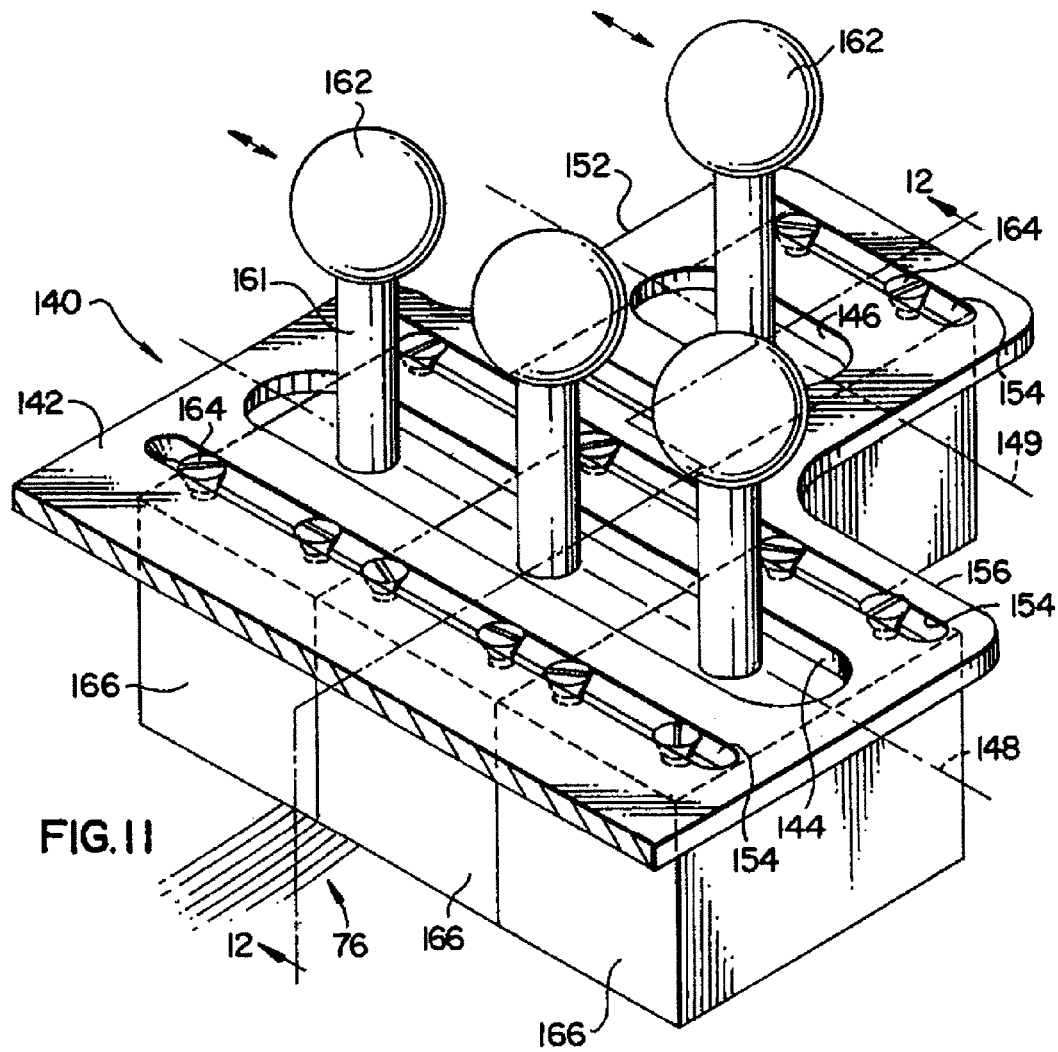
FIG. 11 a perspective view of another embodiment of a console for use with the motor grader of FIG. 1.

An alternative embodiment console 140 is shown in FIG. 11. Console 140 includes base 142. Console 140 is coupled to motor grader 10 in an arrangement similar to console 40. Base 142 defines first joystick slot 144 and second joystick slot 146. First joystick slot 144 provides first joystick slot longitudinal axis 148. Similarly second joystick slot 146 provides second joystick slot longitudinal axis 149. Base 142 also defines mount slots 154. Base 142 also defines blade viewing recess 150 and opposite recess 152. Blade viewing recess 150 is similar to blade viewing recess 50 in that blade viewing recess 150 is configured to allow operator 55 to view a portion of grader blade 18, such as heel 19.

Figure 4:
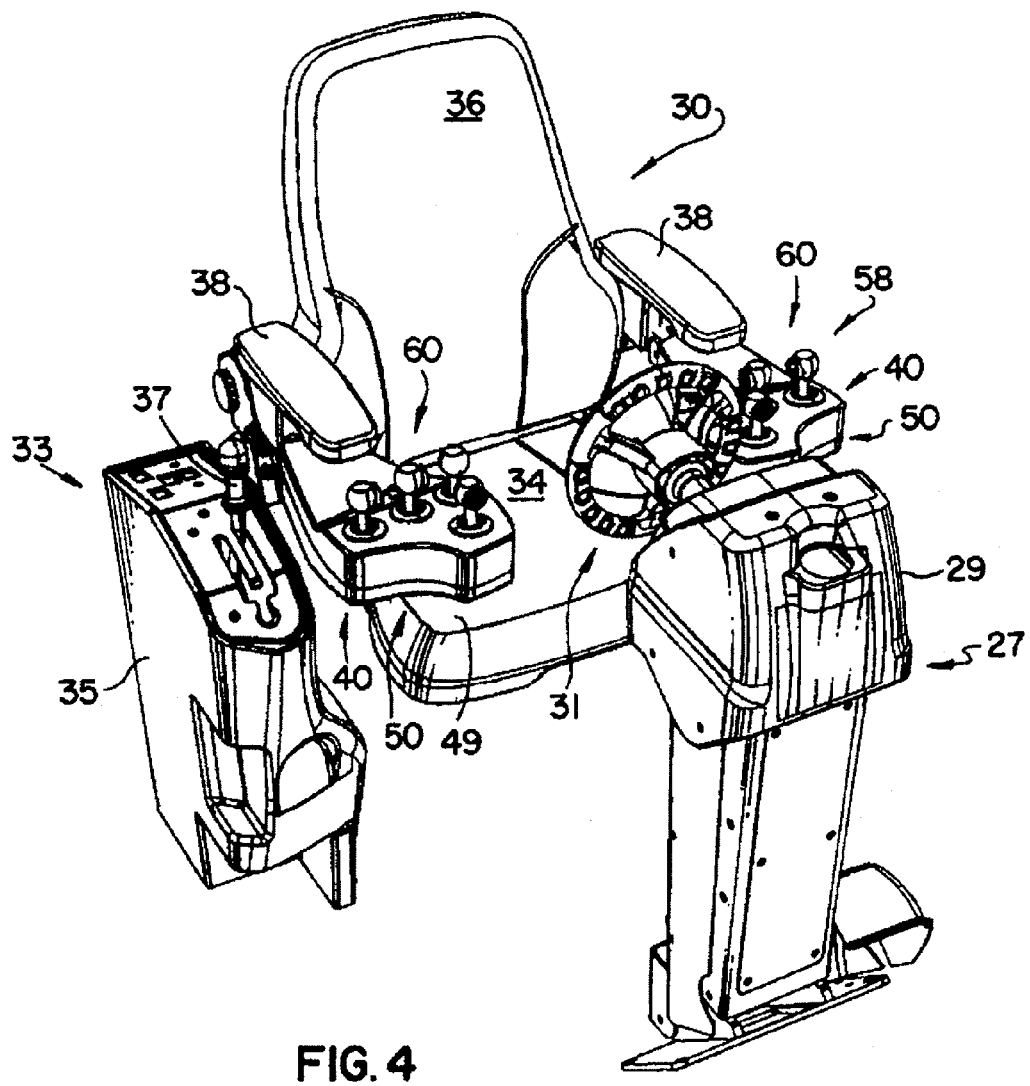
FIG. 4 is a front perspective view of the operator seat assembly, shift console, and steering console of FIG. 2.

Joysticks 160 are shown including joystick shafts 161 and joystick knobs 162 which are similar to joystick shafts 61 and joystick knobs 62 shown in FIG. 4. Joysticks 160 are configured to mount to base 142 by the use of fasteners 164 and joystick mounts 166. As illustrated in this embodiment, fasteners 164 are positioned within mount slot 154 and attached to joystick mounts 166. Joystick mounts 166 are illustrated to support joystick shafts 161 and joystick knobs 162, which are located within first and second joystick slots 144, 146. As shown in FIG. 11, joysticks 160 are arranged in a control system arrangement similar to console 40, as previously described. The control system arrangements are similar in all aspects except for the ones that are explicitly described herein.

Figure 12:
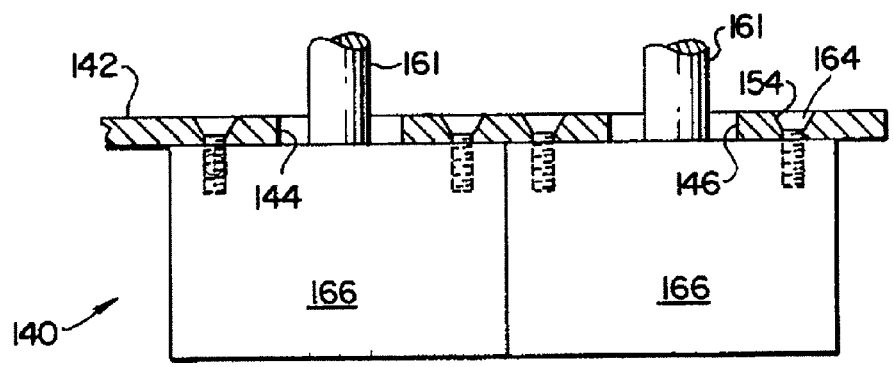
FIG. 12 is a cross-sectional view taken along line 12-12 of FIG. 11.

As shown in FIG. 11, joysticks 160 are configured to mount to base 142 and are configured to adjustably move along longitudinal axes 148, 149. Mount slot 154, as well as first and second joystick slots 144 and 146, allow for translation of joysticks 160 along longitudinal axes 148, 149 in a direction transverse to the longitudinal axis of chassis 12. Joysticks 160 are not limited to a particular mount location, but may be positioned relative to console 140 or each other depending on the preference of the operator. Joysticks 160 are configured to remain coupled to the control system of vehicle 10 so they remain functional even while being moved from one location, such as a first mount location to a lateral, second location. As also shown in FIG. 12, fasteners 164 are located within mount slots 154 and fasten to joystick mounts 166 to hold joysticks 160 in place.

Joysticks 60, 160 are modular. If a joystick 60, 160 needs replaced or repaired, individual joysticks 60, 160 may be removed and replaced without having to remove the remaining joysticks 60, 160. If a joystick 60, 160 fails in the field, the function of the failed joystick 60, 160 can be switched to another joystick 60, 160. If necessary, the functionality of the other joystick can be disabled when replaced. The functionality can be switched to another joystick through the motor grader touch screen monitor 101 (shown in FIG. 10). For example, if rear, center joystick 84 on left control console 40 fails, the side shift function can be transferred to another joystick 60, such as one of auxiliary joysticks 64 or one of the lesser used primary joysticks 60.

The functionality of joysticks 60, 160 can also be reconfigured to satisfy the preferences of the operator. For example, the left blade lift function provided by left, rear joystick 82 of left console 40 may be shifted to center, rear joystick 92 of right console, which is adjacent to right, rear joystick 94 that provides the right blade lift function. In this configuration, both the left end and right end blade lift functions are on adjacent joysticks 60.

Figure 13:
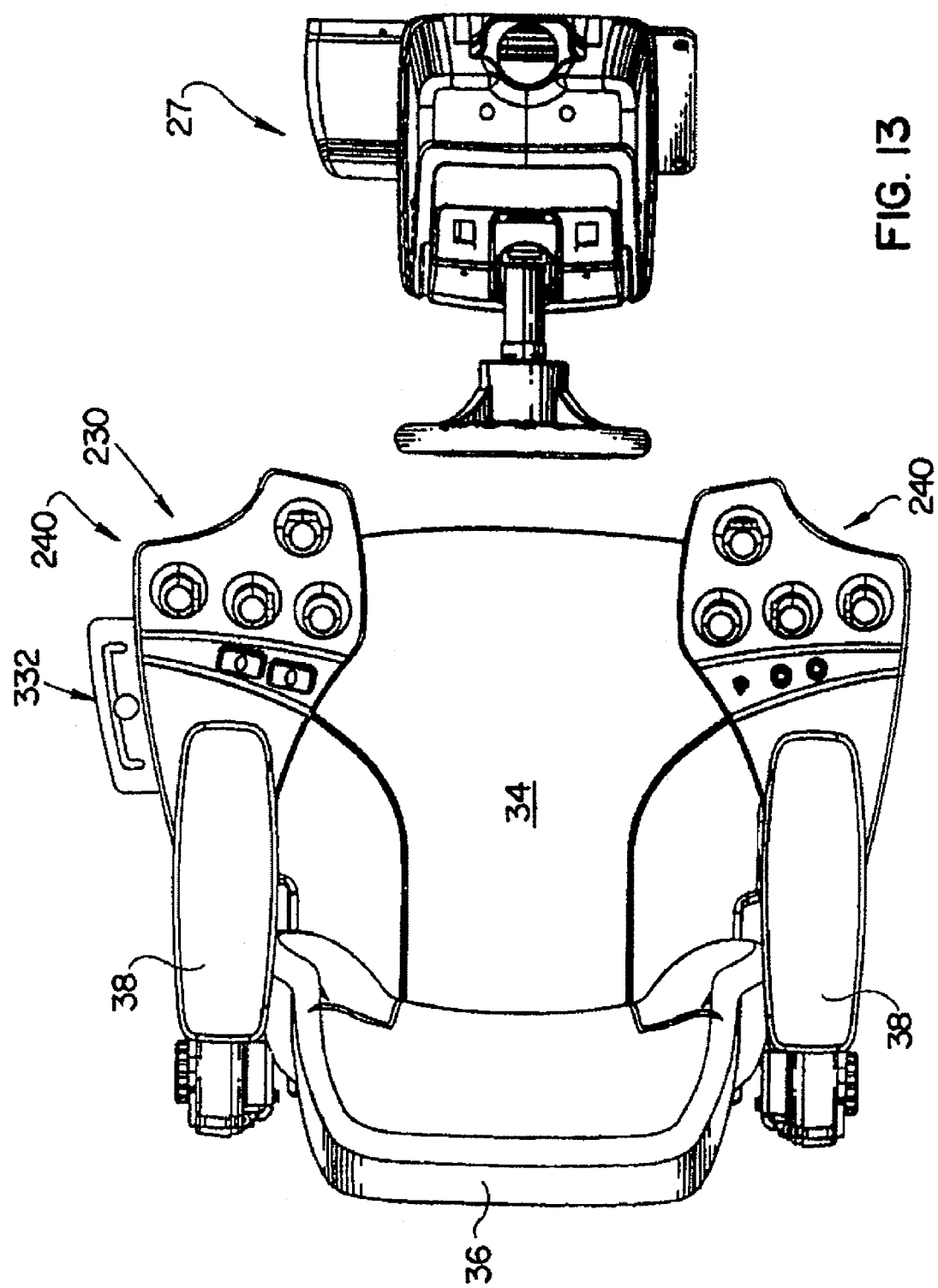
FIG. 13 is a top plan view of an operator seat assembly showing the gear shifter coupled to a left console.
Figure 14:
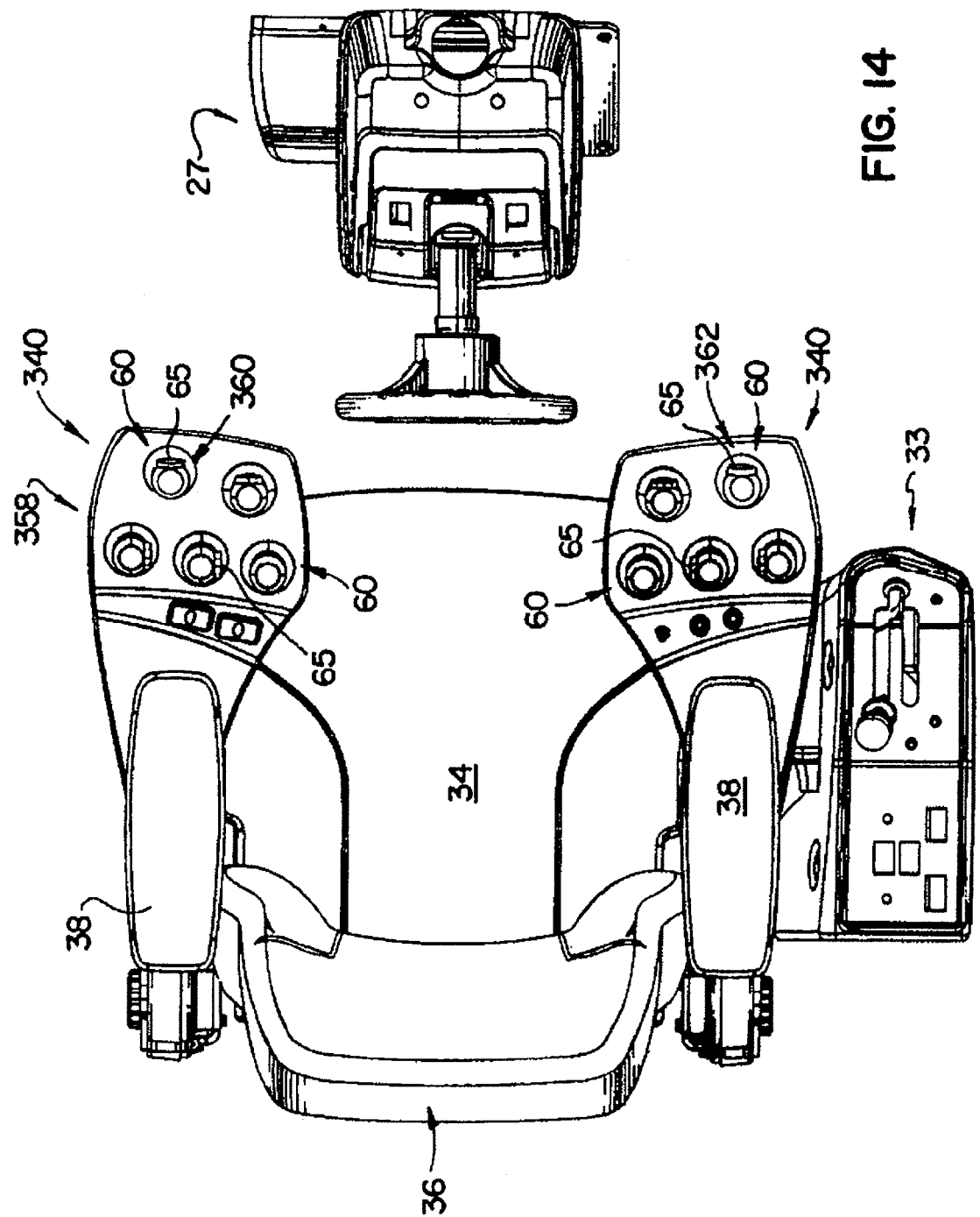
FIG. 14 is a top plan view of another embodiment of seat assembly for use with a motor grader.

In another embodiment, seat assembly 230 is shown in FIG. 13. Shifter 332 is coupled to left console 240 and controls transmission 7. Seat assembly 230 is similar to seat assembly 30 in all other aspects In another embodiment, consoles 340 are shown in FIG. 14. Consoles 340 supports control system 358, which is substantially similar to control system 58. Console 340 is similar to console 40 in all other aspects, except what is explicitly mentioned. Console 340 does not define a recess similar to control recess 50 shown in FIG. 2. Control system 358 includes an additional primary joystick 60. Front, left joystick 360 may control three or more auxiliary functions by moving forward and backward, left and right, and by including one or more button assemblies 65. Similarly, front, right joystick 362 may control three or more auxiliary functions in a similar manner.

Figure 15:
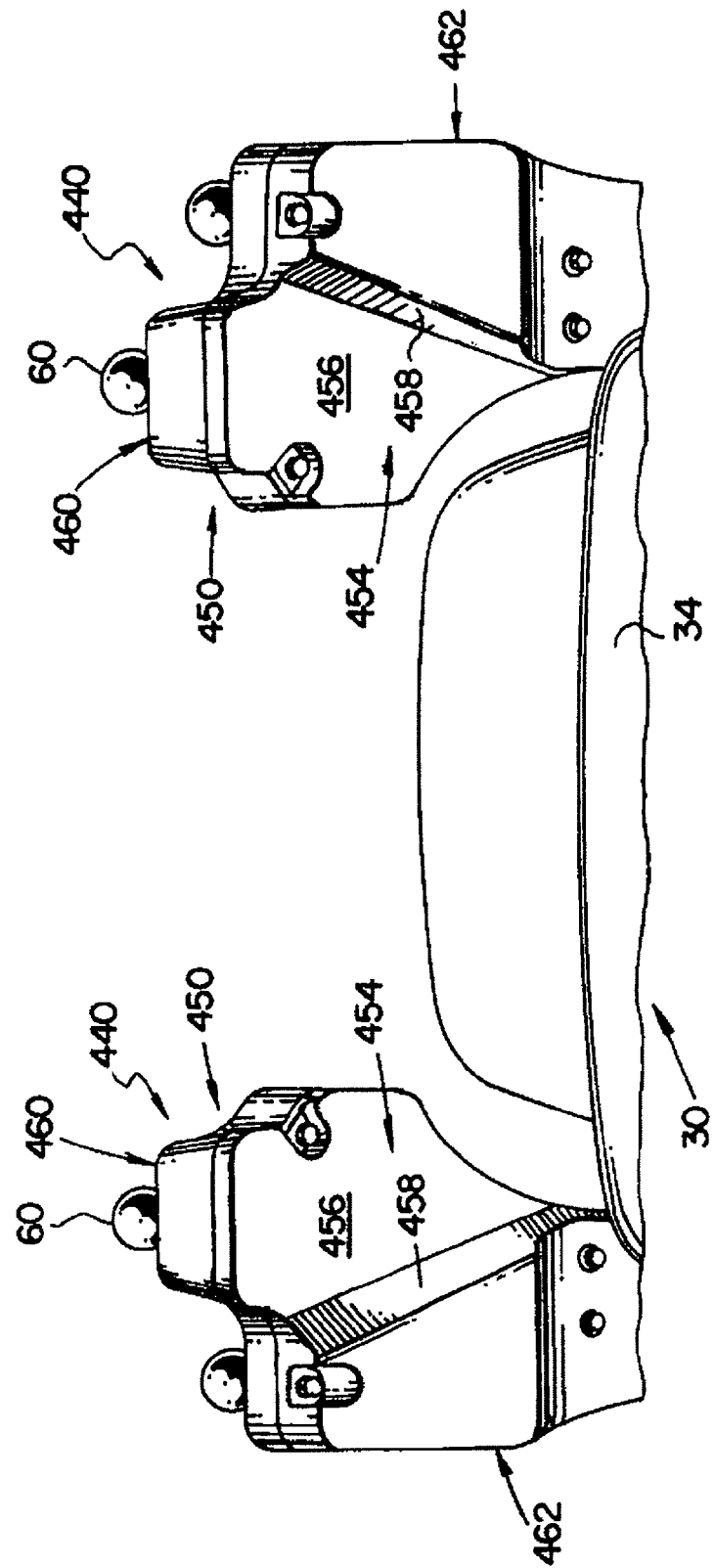
FIG. 15 is a lower perspective view of another alternative embodiment seat assembly for use with a motor grader.

In another embodiment, consoles 440 are shown in FIG. 15. Consoles 540 support control system 58. Consoles 440 are similar to consoles 40 in all other aspects, except what is explicitly mentioned. Consoles 340 define steering wheel recesses 450 that provides additional visibility and clearance between consoles 440 and steering wheel 31. Each console 440 also defines an alternative leg recess 454. Leg recess 454 is defined by downwardly facing surface 456 and inwardly facing surface 458. Portions 460 of consoles positioned directly above seat are thinner than portions 462 not positioned directly over seat 34.

As shown in FIGS. 16 and 17, joysticks 60 include joystick knobs 62 and joystick shafts 61 supporting knobs 62. Preferably, knobs 62 have a spherical ball portion 68 having a diameter 66 of 1.5 inches (3.8 cm), but they may be other diameters. Knobs 62 further include a sleeve 78 that is positioned over shafts 61 and is integral with spherical ball portion 68.

Each joystick knob 62 may also include one or more joystick push button assemblies 65. Joystick knobs 62 may rotate relative to joystick shafts 61 to permit an operator to adjust the relative position of push button assembly 65 to a desired location. As shown in FIG. 17, knob 62 includes a threaded set screw-receiving hole 63 and shaft 61 includes a plurality of threaded holes 73 sized to receive a set screw 75. To change the angular position of button assembly 65, set screw 75 is backed out of hole 73, knob 62 is rotated to the desired position, and set screw 75 is driven back into the appropriate hole 73. Because holes 73 are at predetermined locations, the various positions of knob 62 are also predetermined. However, according to alternative embodiments, the positions are not predetermined. Joystick push button assemblies 65 are illustrated in particular arrangements on joysticks 60. However, joystick push button assemblies 65 are not limited to any particular position or arrangement.

Knobs 62 with push button assemblies 65 are hollow to receive push button assemblies 65 and wires 76 coupled to push button assemblies 65. Similarly, shafts 61 are hollow to receive wires 76 that extend from push button assemblies 65 through shaft 61 to console 40 as shown in FIG. 17.

Figure 20:
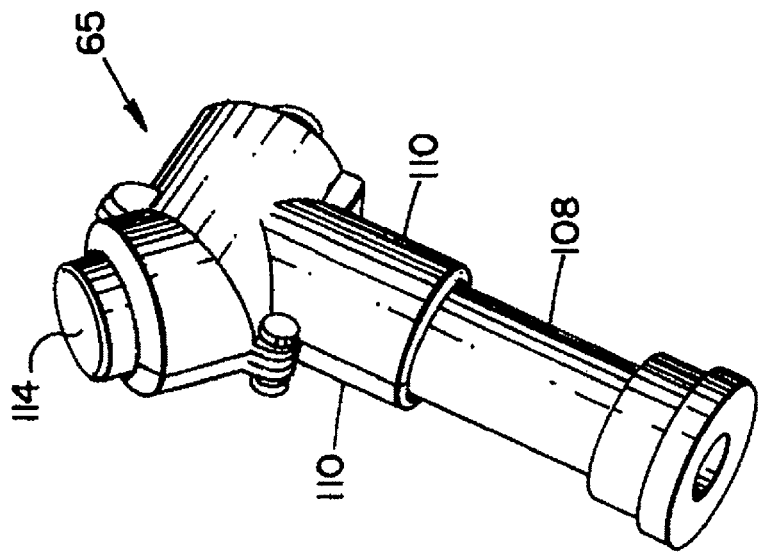
FIG. 20 is a view of a button assembly of the joystick of FIG. 17 mounted on a mold insert before a knob is molded over the button assembly.
Figure 21:
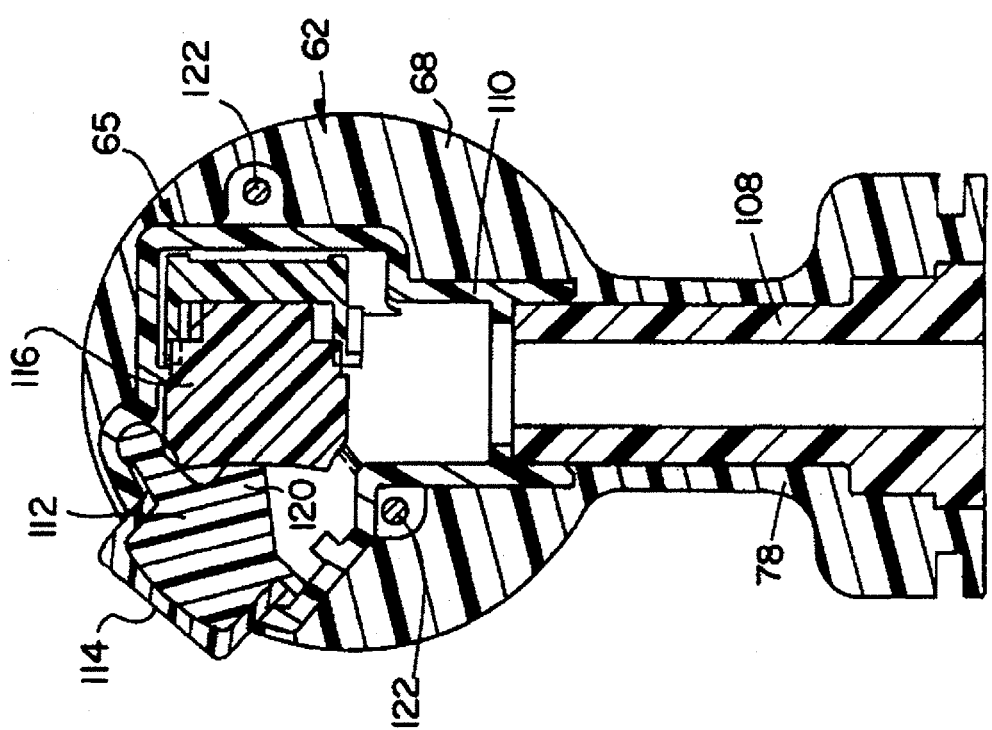
FIG. 21 is a cross-sectional view of a portion of the joystick of FIG. 17 after the knob is molded over the button assembly and the mold insert.
Figure 26:
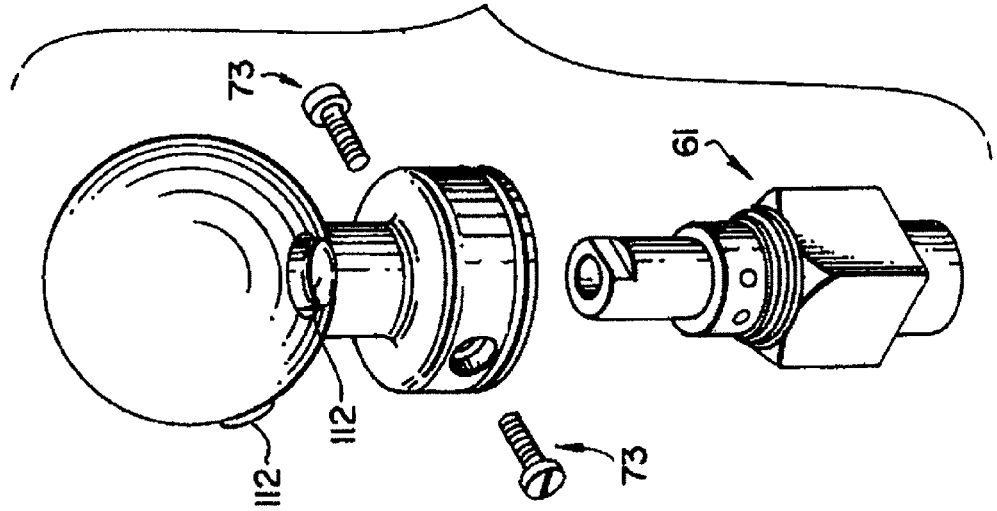
FIG. 26 is an assembly view of the joystick of FIG. 25.

Knobs 62 is molded over push button assemblies 65 to be one piece and avoid seams or split lines that may irritate an operator's hand. During the over molding process, mold insert 108 is placed in push button assembly 65 as shown in FIG. 20. Next, button assembly 65 and mold insert 108 are placed in an injection mold and plastic is injected into the mold to form knob 62 over button assembly 65 and mold insert 108 as shown in FIG. 21. Mold insert 108 is then removed and shaft 61 is inserted into knob 62. Wires 76 are connected to button assembly 65 before or after shaft 61 is inserted into knob 62.

Additional details of button assembly 65 are shown in FIG. 23. Button assembly 65 includes a pair of housings 110, a button 112, a mold cap 114, and a switch 116. During assembly, switch 116, button 112, and mold cap 114 are placed between housings 110 and secured together with fasteners 122. Mold cap 114 is made of silicon and is pinched between housings 110 and button 112 after assembly. During molding of knob 62, mold cap 114 prevents the knob plastic from entering button assembly 65. After knob 62 is molded over button assembly 65, mold cap 114 is removed to provide button 112 clearance to pivot within knob 62 as shown in FIG.

Figure 19:
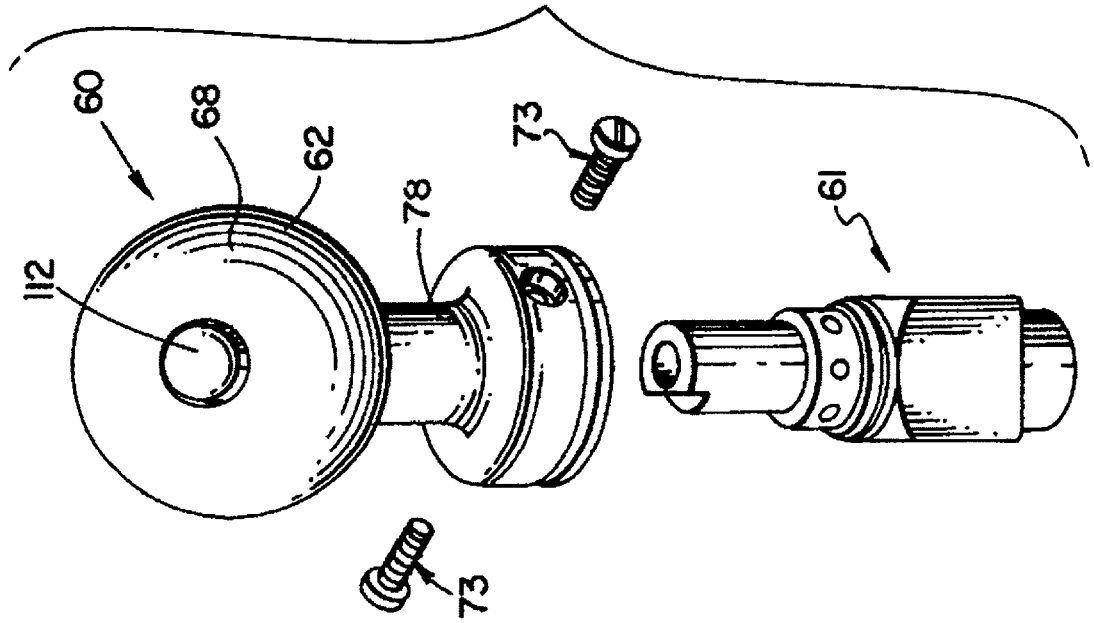
FIG. 19 is an assembly view of the joystick of FIG. 17 showing alternative screws.
Figure 22:
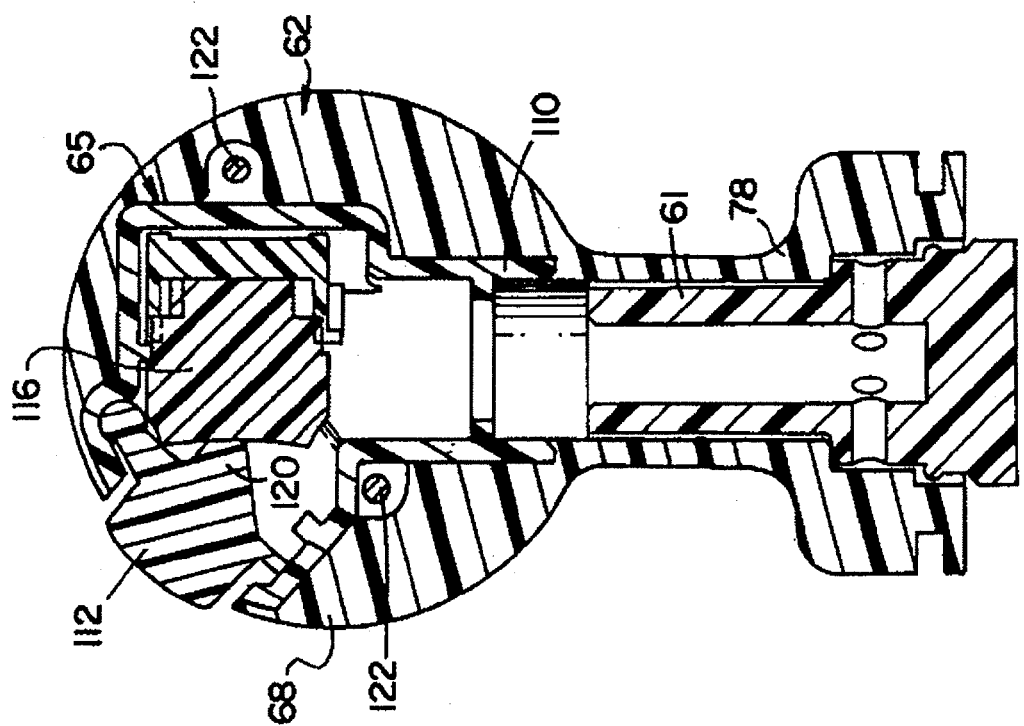
FIG. 22 is a cross-sectional view of the joystick of FIG. 17 showing the mold insert replaced by a joystick shaft.

22. As shown in FIG. 19, as a result of the over molding process, knob 62 is free of split lines because it is molded as one piece.

As shown in FIGS. 23 and 24, button 112 includes a pair of posts 117 and housings 110 include post-receiving apertures 118 that receive posts 117 and allow button 112 to pivot relative to knob 62. Button 112 also includes a back post 120 that depresses switch 116 when button 112 is depressed by an operator 55.

Figure 27:
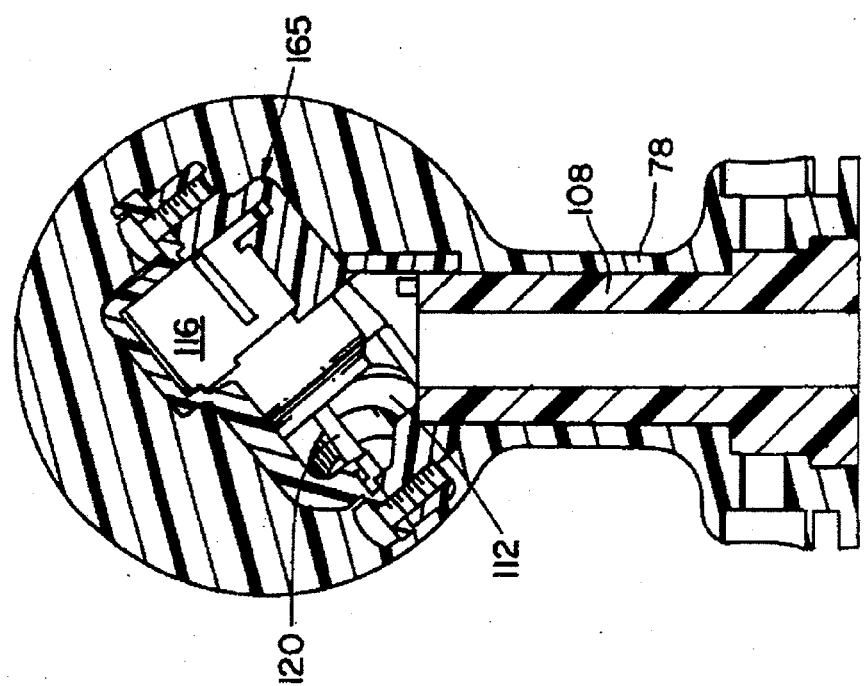
FIG. 27 is a cross-sectional view of a portion of the joystick of FIG. 25 after the knob is molded over the button assembly and mold insert.
Figure 31:
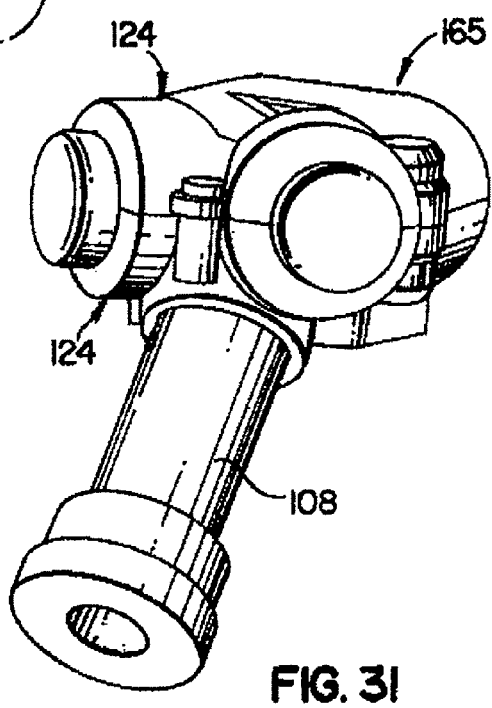
FIG. 31 is a perspective view of the button assembly of the joystick of FIG. 25 mounted on the mold insert before a knob is molded over the button assembly and mold insert.

Knobs 62 is also molded over joysticks 60 with dual push button assembly 165 to avoid seams or split lines that may irritate an operator's hand. During the over molding process, mold insert 108 is placed in dual push button assembly 165 as shown in FIG. 31. Next, dual button assembly 165 and mold insert 108 are placed in an injection mold and plastic is injected into the mold to form knob 62 over button assembly 165 and mold insert 108 as shown in FIG. 27. Mold insert 108 is then removed and shaft 61 is inserted into knob 62. Wires 76 are connected to dual button assembly 165 before or after shaft 61 is inserted into knob 62.

Figure 25:
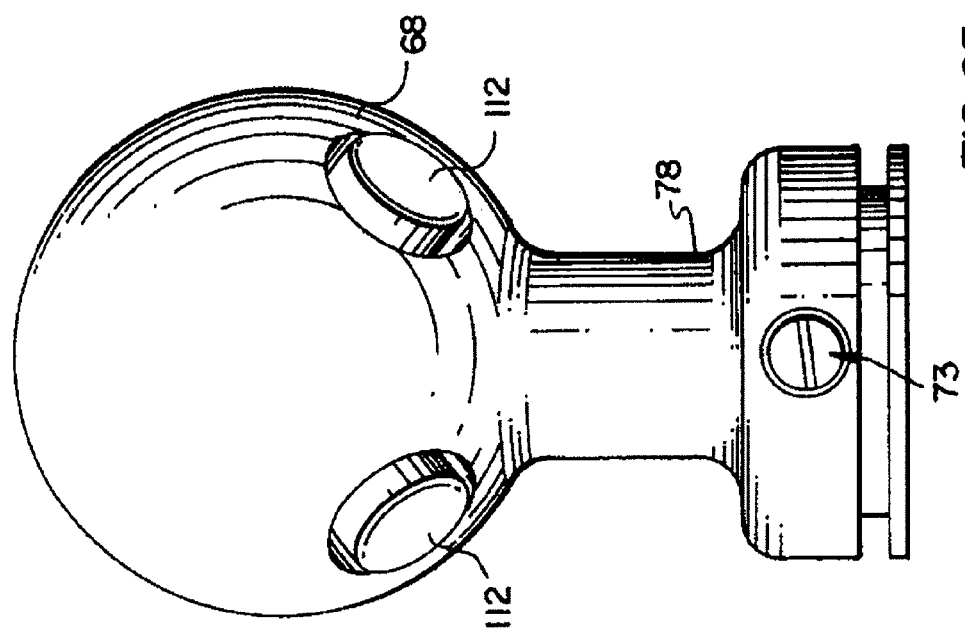
FIG. 25 is a view of a joystick having two buttons.
Figure 28:
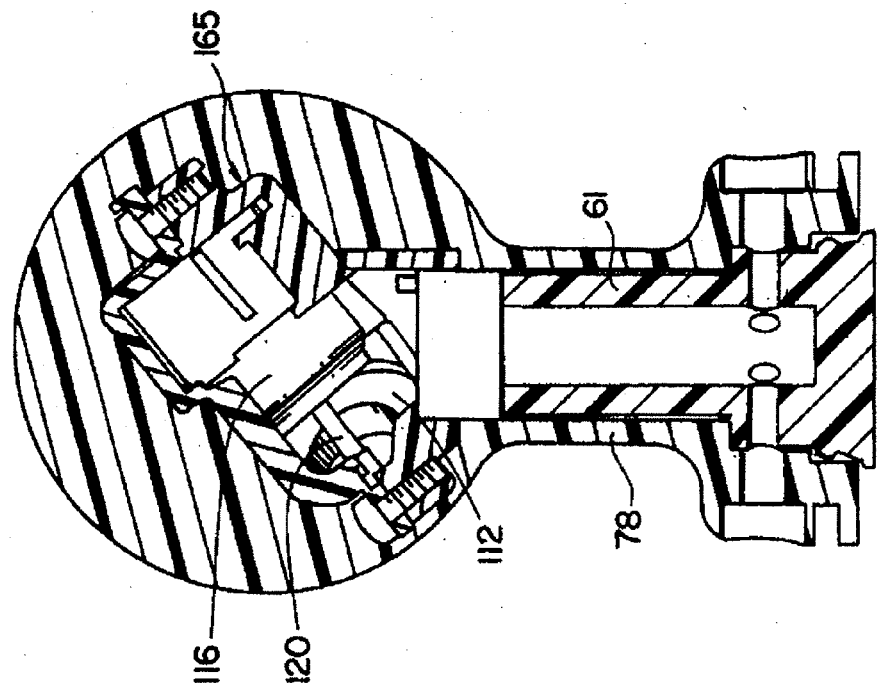
FIG. 28 is a cross-sectional view of the joystick of FIG. 25 showing the mold insert replaced by a joystick shaft.
Figure 29:
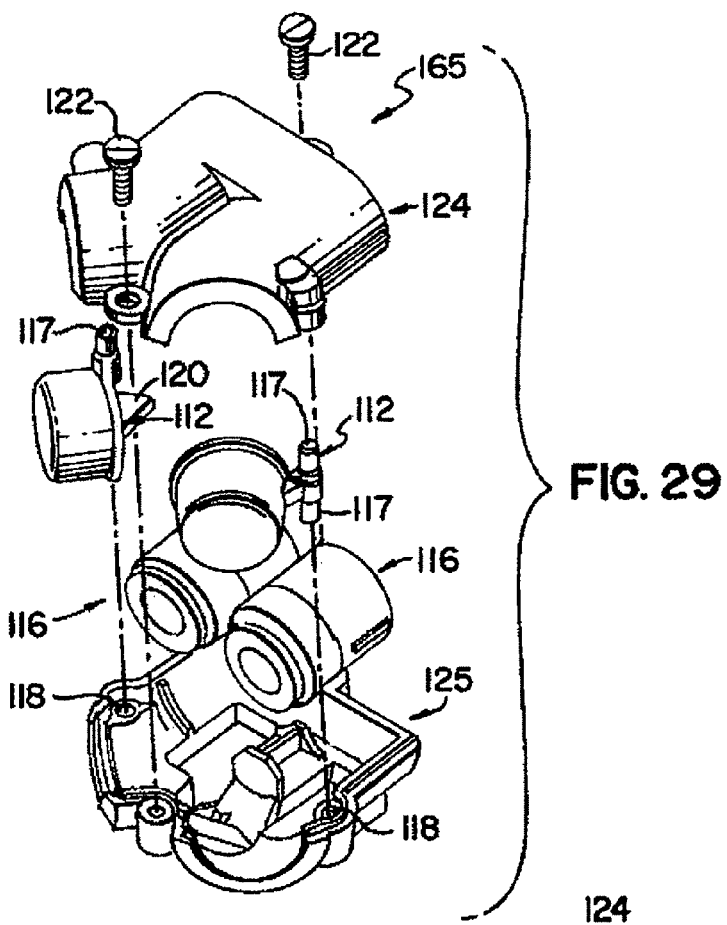
FIG. 29 is an assembly view of the button assembly of the joystick of FIG. 25.
Figure 30:
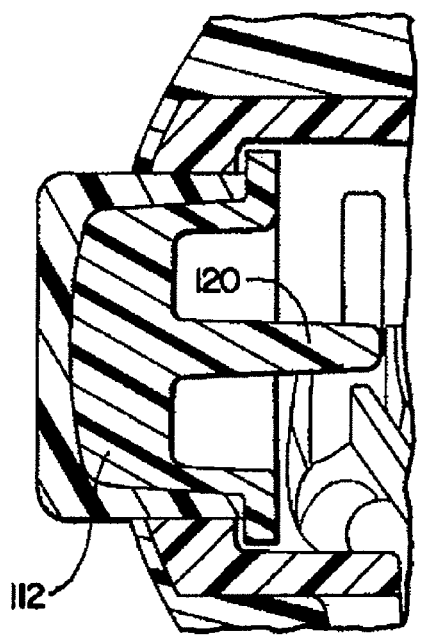
FIG. 30 is a cross-sectional view through the button assembly of the joystick of FIG. 25.

Additional details of dual button assembly 165 are shown in FIG. 29. Dual button assembly 165 includes a pair of housings 124, pair of buttons 112, a pair of mold caps 114, and a pair of switches 116. As shown in FIG. 29, housings 124 include post-receiving apertures 118 that receive posts 117 and allow button 112 to pivot relative to knob 62. During assembly, switches 116, buttons 112, and mold caps 114 are placed between housings 124 and secured together with fasteners 122. Mold caps 114 are pinched between housings 124 and buttons 112 after assembly. During molding of knob 62, mold caps 114 prevent the knob plastic from entering button assembly 165. After knob 62 is molded over button assembly 165, mold caps 114 are removed to provide buttons 112 clearance to pivot within knob 62 as shown in FIG. 25. As a result of the over molding process, knob 62 is free of split lines because it is molded as one piece.

Figure 33:
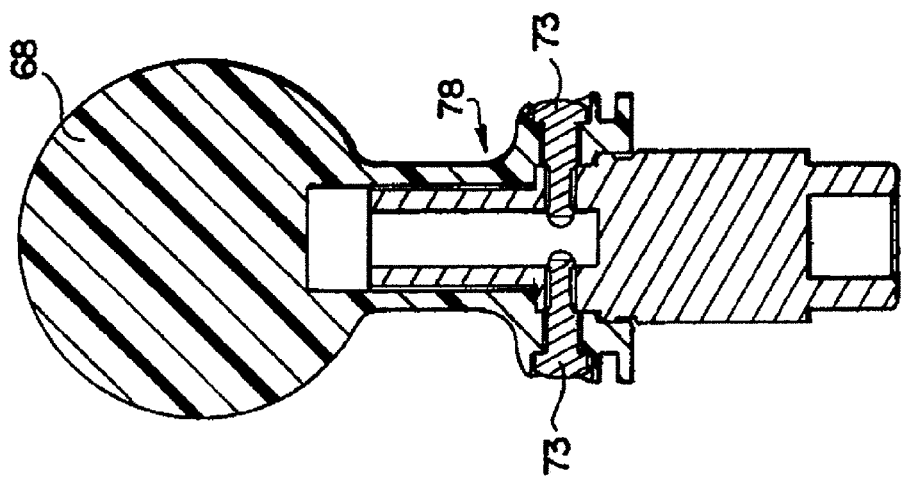
FIG. 33 is a cross-sectional view through the joystick of FIG. 32.
Figure 32:
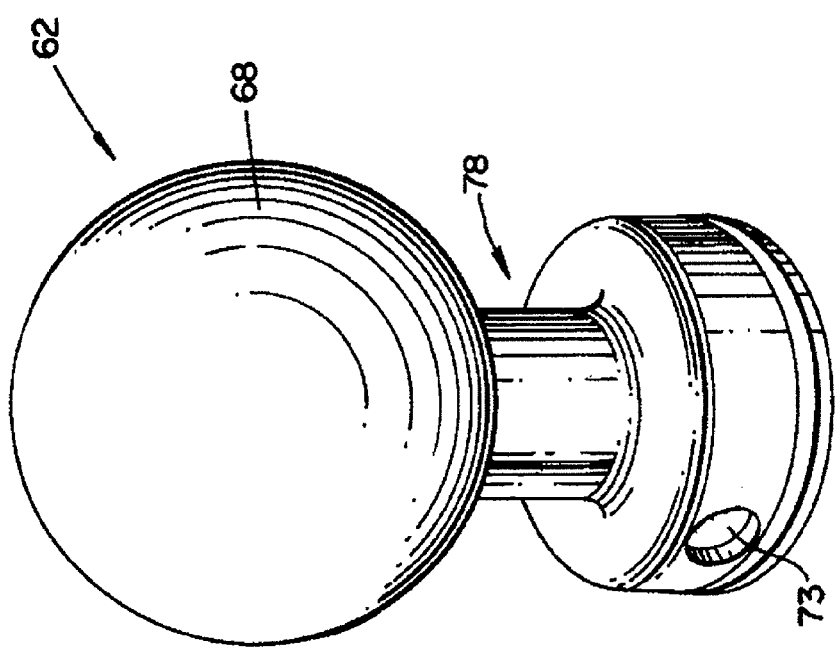
FIG. 32 is a perspective view of a joystick without a button.
Figure 34:
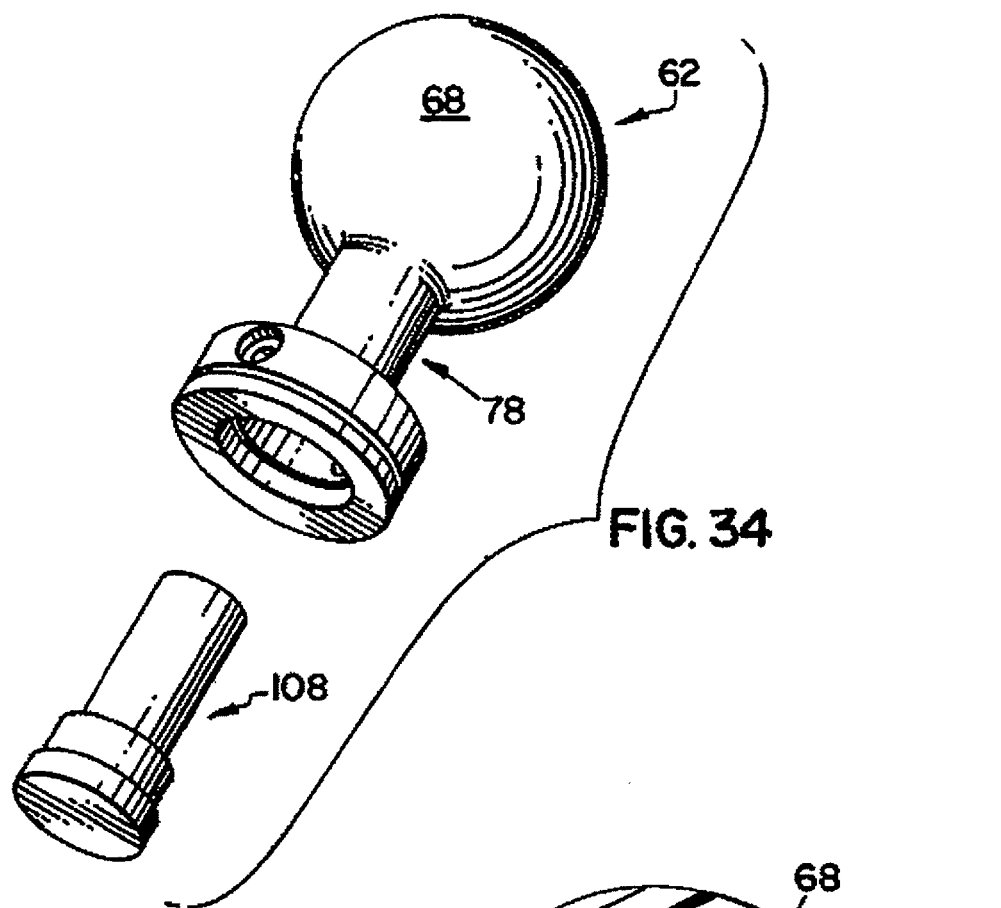
FIG. 34 is a perspective view of a knob of the joystick of FIG. 32 after a mold insert is removed from the knob.
Figure 35:
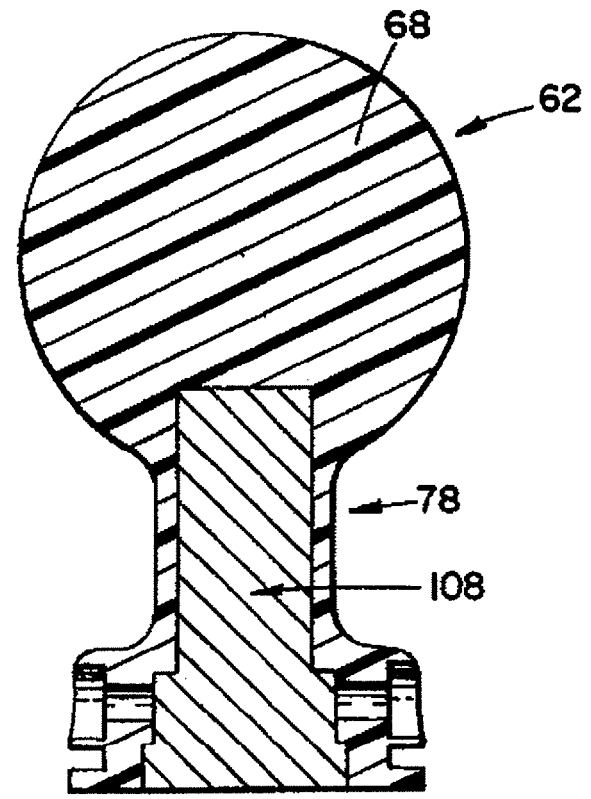
FIG. 35 is a cross-sectional view showing the mold insert within the knob.

Knob 62 without button assembly 65 is shown in FIGS. 32 and 33. A shaft 61 is provided within knob 62. Similar to the molding process for the above-mentioned knobs, a mold insert 108 is placed in the injection mold and plastic is injected into the mold. Then, mold insert 108 is removed and shaft 61 is inserted into knob 62 as shown in FIG. 33.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A construction vehicle including:
a chassis;
a plurality of traction devices positioned to support the chassis on the ground;
a steering wheel supported by the chassis and configured to control the direction of travel of the construction vehicle across the ground;
a ground engaging blade moveably coupled to the chassis;
a control system including a plurality of joysticks, each of the plurality of joysticks being configured to control at least one function of the construction vehicle; and
an operator seat assembly supported by the chassis, the operator seat assembly including a frame, a seat, and a back support; and
a console supported by the operator seat assembly and supporting the plurality of joysticks of the control system, the console being spaced apart from the steering wheel by a distance of 3 inches or less.

2. The construction vehicle of claim 1, wherein the steering wheel has a diameter less than 12 inches.

3. The construction vehicle of claim 1, wherein the console is spaced apart from the steering wheel by less than 2 inches.

4. A construction vehicle including:
a chassis;
a plurality of traction devices positioned to support the chassis on the ground;
a steering wheel supported by the chassis and configured to control the direction of travel of the construction vehicle across the ground;
a ground engaging blade moveably coupled to the chassis;
a control system including a plurality of joysticks, each of the plurality of joysticks being configured to control at least one function of the construction vehicle; and
an operator seat assembly supported by the chassis, the operator seat assembly including a frame, a seat, and a back support; and
a console supported by the operator seat assembly and supporting the plurality of joysticks of the control system, the console being spaced apart from the steering wheel by a distance of 3 inches or less,
wherein the control system includes a second plurality of joysticks, and
wherein the construction vehicle further includes a second console supported by the operator seat assembly and supporting the second plurality of joysticks, the consoles being laterally spaced apart by a distance less than a maximum lateral width of the seat.

5. The construction vehicle of claim 4, wherein the distance between the consoles is less than 15 inches.

6. The construction vehicle of claim 1, wherein a forward-most portion of the console has a longitudinal position substantially equal to a longitudinal position of a rearward-most portion of the steering wheel.

7. A construction vehicle including:
a chassis;
a plurality of traction devices positioned to support the chassis on the ground;
a steering wheel supported by the chassis and configured to control the direction of travel of the construction vehicle across the ground, the steering wheel having a diameter;
a ground engaging blade moveably coupled to the chassis;
a control system including a plurality of joysticks, each of the plurality of joysticks being configured to control at least one function of the construction vehicle;
an operator seat assembly supported by the chassis, the operator seat assembly including a frame, a seat, a pair of armrests laterally spaced apart by an armrest gap, and a back support, a ratio of the armrest gap to the steering wheel diameter being greater than 1.5; and
a console supported by the operator seat assembly and supporting the plurality of joysticks of the control system.

8. The construction vehicle of claim 7, wherein the ratio is greater than 1.75.

9. The construction vehicle of claim 7, wherein the diameter of the steering wheel is less than 12 inches.

10. The construction vehicle of claim 7, wherein the armrest gap is at least 17 inches.

11. The construction vehicle of claim 7, wherein the console and the steering wheel are spaced apart by a distance of 3 inches or less.

12. The construction vehicle of claim 7, wherein at least one of the plurality of joysticks is positioned directly over the seat.

13. A construction vehicle including:
a chassis;
a plurality of traction devices positioned to support the chassis on the ground;
a steering wheel supported by the chassis and configured to control the direction of travel of the construction vehicle across the ground;
a ground engaging blade moveably coupled to the chassis;
a control system including a plurality of joysticks, each of the plurality of joysticks being configured to control at least one function of the construction vehicle;
an operator seat assembly supported by the chassis, the operator seat assembly including a frame, a seat, a pair of armrests laterally spaced apart by an armrest gap, and a back support; and
a console supported by the operator seat assembly and supporting the plurality of joysticks of the control system, the console and the steering wheel being spaced apart by a console-steering wheel gap, a ratio of the armrest gap to the console-steering wheel gap being greater than 5.

14. The construction vehicle of claim 13, wherein the ratio is greater than 7.5.

15. The construction vehicle of claim 14, wherein the ratio is greater than 10.

16. The construction vehicle of claim 13, wherein the console-steering wheel gap is less than 3 inches.

17. A construction vehicle including:
a chassis;
a plurality of traction devices positioned to support the chassis on the ground;
a steering wheel supported by the chassis and configured to control the direction of travel of the construction vehicle across the ground;
a ground engaging blade moveably coupled to the chassis;
a control system including a plurality of joysticks, each of the plurality of joysticks being configured to control at least one function of the construction vehicle;
an operator seat assembly supported by the chassis, the operator seat assembly including a frame, a seat, a pair of armrests laterally spaced apart by an armrest gap, and a back support; and
a console supported by the operator seat assembly and supporting the plurality of joysticks of the control system, the console and the steering wheel being spaced apart by a console-steering wheel gap, a ratio of the armrest gap to the console-steering wheel gap being greater than 5,
wherein the control system includes a second plurality of joysticks, and
wherein the construction vehicle further includes a second console supported by the operator seat assembly and supporting the second plurality of joysticks, the consoles cooperating to define a lateral gap therebetween that is less than 15 inches.

18. The construction vehicle of claim 17, wherein the armrest gap between the armrests exceeds the lateral gap between the consoles.

19. A construction vehicle including:
a chassis;
a plurality of traction devices positioned to support the chassis on the ground;
a steering wheel supported by the chassis and configured to control the direction of travel of the construction vehicle across the ground;
a ground engaging blade moveably coupled to the chassis;
an operator seat assembly supported by the chassis, the operator seat assembly including a frame, a seat, a pair of armrests laterally spaced apart by an armrest gap, and a back support; a control system including a first plurality of joysticks and a second plurality of joysticks, each of the first and second plurality of joysticks being configured to control at least one function of the construction vehicle;
a first console supported by the operator seat assembly and supporting the first plurality of joysticks of the control system; and
a second console supported by the operator seat assembly and supporting the second plurality of joysticks of the control system, the first and second consoles being laterally spaced apart by a console gap, a ratio of the armrest gap to the console gap being greater than 1.25.

20. The construction vehicle of claim 19, wherein the ratio is greater than 1.4.

21. The construction vehicle of claim 19, wherein the armrest gap is greater than 17 inches.

22. The construction vehicle of claim 21, wherein the console gap is less than 15 inches.

23. The construction vehicle of claim 19, wherein the first and second consoles are spaced apart from the steering wheel by less than 3 inches.

24. The construction vehicle of claim 19, wherein at least one of the first and second plurality of joysticks is positioned directly over the seat.

* * * * *

UNITED STATES PATENT AND TRADEMARK OFFICE
CERTIFICATE OF CORRECTION

PATENT NO. : 8,360,193 B2
APPLICATION NO. : 13/408381
DATED : January 29, 2013
INVENTOR(S) : Harber et al.

It is certified that error appears in the above-identified patent and that said Letters Patent is hereby corrected as shown below:

On the first page, under listing of inventors (75), please change Darrell Jeffrey Rowan to Darrel Jeffrey Rowan On the first page, under related U.S. application data (63), please change Continuation of application No. 13/247,182 to 13/347,182

Signed and Sealed this
Nineteenth Day of March, 2013

Teresa Stanek Rea
*Acting Director of the United States Patent and Trademark Office*